United States Patent
Nahas et al.

(10) Patent No.: US 12,452,210 B2
(45) Date of Patent: Oct. 21, 2025

(54) SYNTHETIC AUDIT EVENTS IN WORKLOAD SEGMENTATION

(71) Applicant: Zscaler, Inc., San Jose, CA (US)

(72) Inventors: Peter Nahas, Watertown, MA (US); Michael J. Melson, Arlington, MA (US); Scott Laplante, Bedford, NH (US); Raymond Brian Liu, Lexington, MA (US)

(73) Assignee: Zscaler, Inc., San Jose, CA (US)

( * ) Notice: Subject to any disclaimer, the term of this patent is extended or adjusted under 35 U.S.C. 154(b) by 286 days.

(21) Appl. No.: 17/582,520

(22) Filed: Jan. 24, 2022

(65) Prior Publication Data

US 2023/0239270 A1    Jul. 27, 2023

(51) Int. Cl.
*H04L 29/00* (2006.01)
*H04L 9/40* (2022.01)

(52) U.S. Cl.
CPC .......... *H04L 63/0236* (2013.01); *H04L 63/20* (2013.01)

(58) Field of Classification Search
CPC ............................ H04L 63/0236; H04L 63/20
USPC ............................................................ 726/1
See application file for complete search history.

(56) References Cited

U.S. PATENT DOCUMENTS

| | | | |
|---|---|---|---|
| 10,154,067 B2 | 12/2018 | Smith et al. | |
| 10,439,985 B2* | 10/2019 | O'Neil | H04L 43/04 |
| 10,892,964 B2* | 1/2021 | Sharma | H04L 43/0876 |
| 11,190,550 B1* | 11/2021 | Wu | H04L 63/20 |
| 2008/0287194 A1* | 11/2008 | Lee | G06N 3/006 |
| | | | 463/43 |
| 2019/0349283 A1 | 11/2019 | O'Neil et al. | |
| 2020/0021618 A1 | 1/2020 | Smith et al. | |

FOREIGN PATENT DOCUMENTS

WO    2018152303 A1    8/2018

* cited by examiner

*Primary Examiner* — Brandon Hoffman
*Assistant Examiner* — Michael D Anderson
(74) *Attorney, Agent, or Firm* — Baratta Law PLLC; Lawrence A. Baratta, Jr.

(57) ABSTRACT

Systems and methods include operating a local security agent that is configured to allow or block flows based on security policies, to implement microsegmentation; and, responsive to a block of a flow, creating a synthetic audit event that reflects what the flow would have been had it not been blocked. The steps can include creating a packet for the flow and transmitting the packet with an indicator that it represents the synthetic audit event. The steps can include receiving the security policies which include an indicator on which blocks to create the synthetic audit event.

20 Claims, 14 Drawing Sheets

SYNTHETIC AUDIT EVENTS IN WORKLOAD SEGMENTATION

FIELD OF THE DISCLOSURE

The present disclosure relates generally to networking and computing. More particularly, the present disclosure relates to systems and methods for synthetic audit events in workload segmentation, stream processing of telemetry for a network topology, and software security agent updates via microcode.

BACKGROUND OF THE DISCLOSURE

Flat networks increase risk in the cloud and data centers. A flat network is one where various hosts are interconnected in a network with large segments. Flat networks allow excessive access via unprotected pathways that allow attackers to move laterally and compromise workloads in cloud and data center environments. Experts agree that shrinking segments and eliminating unnecessary pathways is a core protection strategy for workloads. However, the cost, complexity, and time involved in network segmentation using legacy virtual firewalls outweighs the security benefit. The best-known approaches to network security require that each host on a network and each application have the least possible access to other hosts and applications, consistent with performing their tasks. In practice, this typically requires creating large numbers of very fine-grained rules that divide a network into many separate subnetworks, each with its own authority and accessibility. This is referred to as "segmentation" (or referred to as "microsegmentation," which is described herein and the differences with segmentation) and is a key aspect of so-called Zero Trust Network Access (ZTNA). Shrinking network segments advantageously eliminates unnecessary attack paths and reduces the risk of compromises. Workload segmentation advantageously stops the lateral movement of threats and prevents application compromises and data breaches. ZTNA, also known as the Software-Defined Perimeter (SDP), is a set of technologies that operates on an adaptive trust model, where trust is never implicit, and access is granted on a "need-to-know," least-privileged basis defined by granular policies.

In practice, it is very difficult to perform segmentation well. Knowing in detail what functions a network is performing and then crafting hundreds or thousands of precise rules for controlling access within the network is a process that often takes years and is prone to failure. Crafting such rules is difficult and expensive to perform manually precisely because it requires humans to perform several tasks that humans find it difficult to perform well, such as understanding big data and writing large sets of interacting rules. Legacy network security is complex and time-consuming to deploy and manage. Address-based, perimeter controls, such as via firewalls, were not designed to protect internal workload communications. As a result, attackers can "piggyback" on approved firewall rules. Application interactions have complex interdependencies. Existing solutions translate "application speak" to "network speak," resulting in thousands of policies that are almost impossible to validate. Stakeholders need to be convinced that the risk will be reduced. Can security risk be reduced without breaking the application? Practitioners struggle to measure the operational risk of deploying complex policies accurately.

While all agree segmentation reduces risk, there is uncertainty in practice that it can be applied effectively. There are techniques described for implementing automated microsegmentation, such as, for example, described in U.S. patent application Ser. No. 17/101,383, filed Nov. 23, 2020, and entitled "Automatic segment naming in Microsegmentation," and U.S. Pat. No. 10,154,067, issued Dec. 11, 2018, and entitled "Network Application Security Policy Enforcement," the contents of each are incorporated by reference herein.

One issue involved in microsegmentation is that local security agents operating on hosts are meant to be as lightweight as possible. These local security agents are configured to allow or block or notify connections based on local policy. Because they are lightweight, they perform low levels of logging and do not necessarily report all events to a centralized system, such as the cloud. Accordingly, there is not a centralized view of activity in a microsegmentation or workload segmentation system. That is, the local security agents block events and there is no approach to provide an alert, i.e., an alert for something that never happened.

Another issue involved in microsegmentation involves creating a full view of a network topology. Here, the local security agents on hosts in the network report back as to what they see, that is, the network topology. The current approach includes step of collect topology, build segments, and use the segments. This is a complete picture of the network. However, it would be preferable to perform the collect in an incremental manner as information arrives rather than occasionally in a batch, both for efficiency as well as being up to date as soon as possible.

Another issue relates to updating of the local security agents. These agents are installed on servers and other devices in data centers. There are limited windows for software upgrades or updates, e.g., these can be extremely limited even only a couple times a year. There are consistently needs to update the local security agents to address vulnerabilities, add new functionality, etc. And this limited update window is problematic. Note, typically workload segmentation is performed within the data center on large scale servers and hardware. This update problem is less an issue in end user devices.

BRIEF SUMMARY OF THE DISCLOSURE

The present disclosure relates to systems and methods for present disclosure relates to systems and methods for synthetic audit events in workload segmentation, stream processing of telemetry for a network topology, and software security agent updates via microcode. The goal of microsegmentation is to limit host and application access as much as possible in a Zero Trust architecture. The synthetic audit events include an approach to reconstruct source and destination packets for blocked communications, for purposes of logging, alerting, etc. The stream processing of telemetry enabled incremental development of the network topology on an ongoing basis. The software security agent updates utilize microcode, such as Lua, to enable some form of modification/updates on the software security agents.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for application identity-based enforcement of datagram protocols. The goal of microsegmentation is to limit host and application access as much as possible in a Zero Trust architecture. The synthetic audit events include an approach to reconstruct source and destination packets for blocked communications, for purposes of logging, alerting, etc. The stream processing of telemetry enabled incremental development of the network topology on an ongoing basis. The software security agent updates utilize microcode, such as Lua, to enable some form of modification/updates on the software security agents.

§ 1.0 MICROSEGMENTATION

Workload segmentation includes an approach to segment application workloads. In an automated manner, with one click, the workload segmentation determines risk and applies identity-based protection to workloads—without any changes to the network. The software identity-based technology provides gap-free protection with policies that automatically adapt to environmental changes.

Microsegmentation originated as a way to moderate traffic between servers in the same network segment. It has evolved to include intra-segment traffic so that Server A can talk to Server B or Application A can communicate with Host B, and so on, as long as the identity of the requesting resource (server/application/host/user) matches the permission configured for that resource. Policies and permissions for microsegmentation can be based on resource identity, making it independent from the underlying infrastructure, unlike network segmentation, which relies on network addresses. This makes microsegmentation an ideal technique for creating intelligent groupings of workloads based on the characteristics of the workloads communicating inside the data center. Microsegmentation, a fundamental part of the Zero Trust Network Access (ZTNA) framework, is not reliant on dynamically changing networks or the business or technical requirements placed on them, so it is both stronger and more reliable security. It is also far simpler to manage—a segment can be protected with just a few identity-based policies instead of hundreds of address-based rules.

Figure 1:
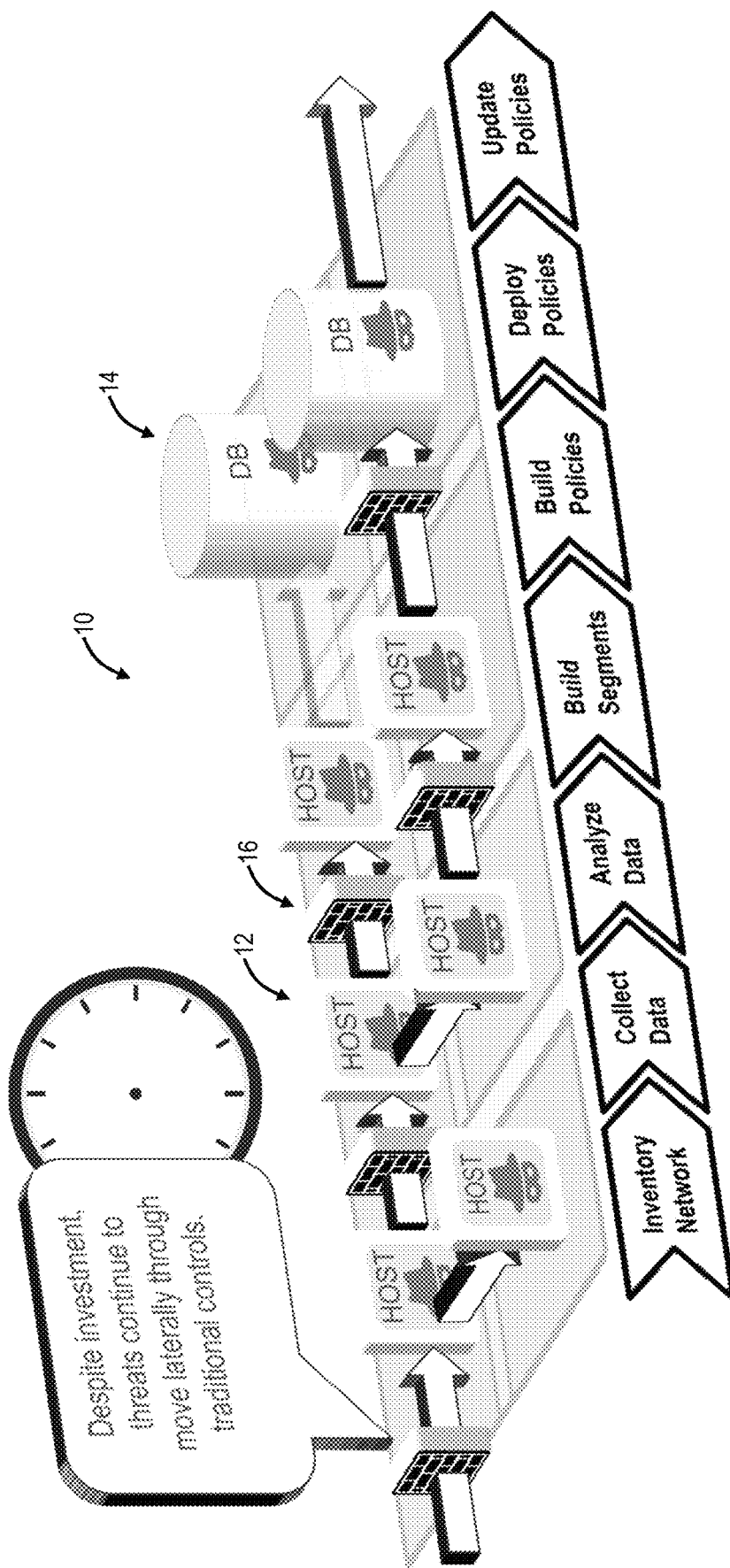
FIG. 1 is a network diagram of a network illustrating conventional microsegmentation.

FIG. 1 is a network diagram of a network 10 illustrating conventional microsegmentation. The network 10 includes hosts 12, databases 14, and firewalls 16. Legacy network-based microsegmentation solutions rely on the firewalls 16, which use network addresses for enforcing rules. This reliance on network addresses is problematic because networks constantly change, which means policies must be continually updated as applications and devices move. The constant updates are a challenge in a data center, and even more so in the cloud and where Internet Protocols (IP) addresses are ephemeral. Network address-based approaches for segmentation cannot identify what is communicating—for example, the software's identity—they can only tell how it is communicating, such as the IP address, port, or protocol from which the "request" originated. As long as they are deemed "safe," communications are allowed, even though IT does not know exactly what is trying to communicate. Furthermore, once an entity is inside a network zone, the entity is trusted. But this trust model can lead to breaches, and that is one major reason microsegmentation evolved.

Figure 2:
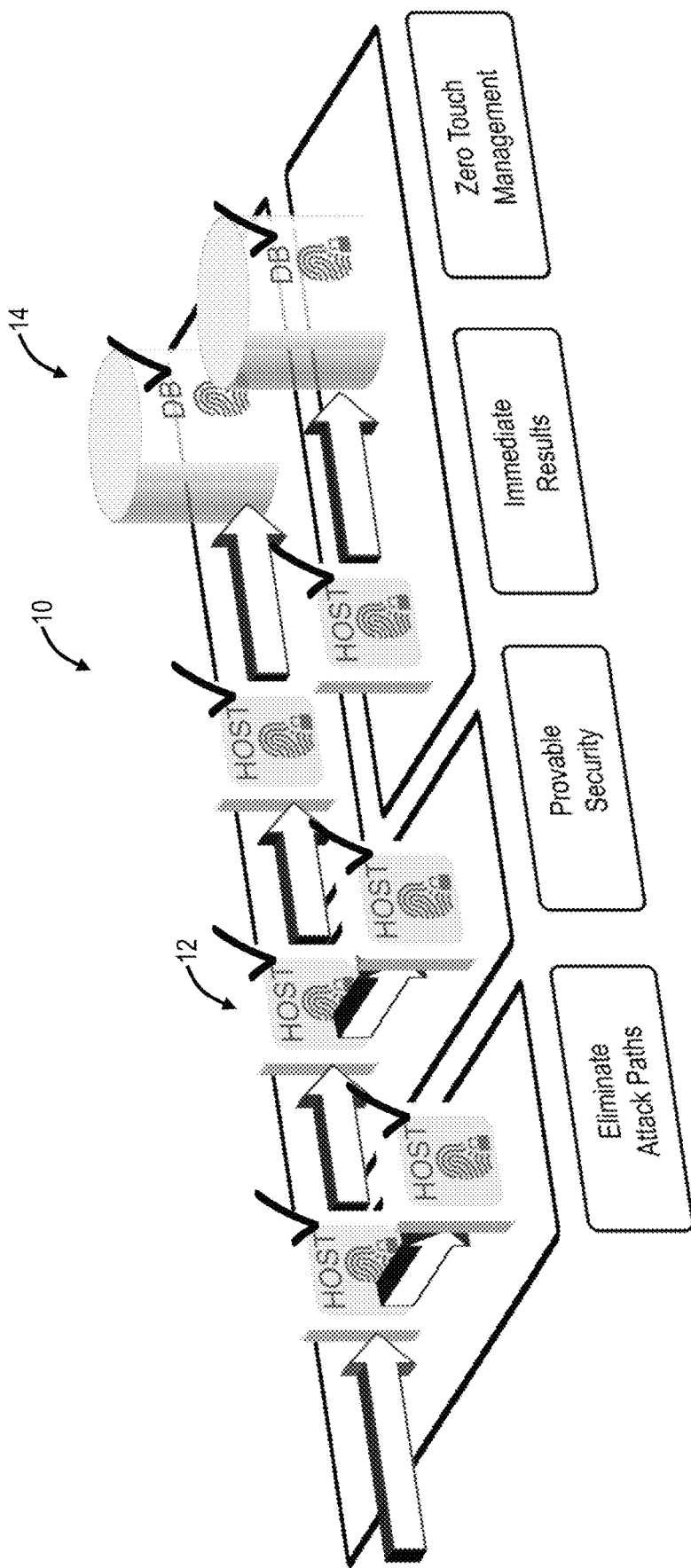
FIG. 2 is a network diagram of the network illustrating automated microsegmentation.

FIG. 2 is a network diagram of the network 10 illustrating automated microsegmentation. Microsegmentation is a way to create secure zones so that companies can isolate workloads from one another and secure them individually. It is designed to enable granular partitioning of traffic to provide greater attack resistance. With microsegmentation, IT teams can tailor security settings to different traffic types, creating policies that limit network and application flows between workloads to those that are explicitly permitted. In this zero trust security model, a company could set up a policy, for example, that states medical devices can only talk to other medical devices. And if a device or workload moves, the security policies and attributes move with it. By applying segmentation rules down to the workload or application, IT can reduce the risk of an attacker moving from one compromised workload or application to another.

Microsegmentation is not the same as network segmentation. It is fairly common for network segmentation and microsegmentation to be used interchangeably. In reality, they are completely different concepts. Network segmentation is best used for north-south traffic, meaning the traffic that moves into and out of the network. With network segmentation, an entity, such as a user, is generally considered trusted once inside a network's designated zone. Microsegmentation is best used for east-west traffic, or traffic that moves across the data center network—server-to-server, application-to-server, etc. Simply put, network segmentation is the castle's outer walls, while microsegmentation represents the guards standing at each of the castle's doors.

Microsegmentation's main purpose is to reduce the network attack surface by limiting east-west communication by applying granular security controls at the workload level. In the simplest terms, the differences between microsegmentation and network segmentation can be boned down to:

| Segmentation | Microsegmentation |
| --- | --- |
| Coarse policies | Granular policies |
| Physical network | Virtual or overlay network |
| North-south traffic | East-west traffic |
| Address based/network level | Identity-based/workload level |
| Hardware | Software |

Since policies and permissions for microsegmentation are based on resource identity (versus a user's/person's identity), it is independent of the underlying infrastructure, which means: Fewer policies to manage, centralized policy management across networks, policies that automatically adapt regardless of infrastructure changes, and gap-free protection across cloud, container, and on-premises data centers.

Generally, microsegmentation creates intelligent groupings of workloads based on characteristics of the workloads communicating inside the data center. As such, microsegmentation is not reliant on dynamically changing networks or the business or technical requirements placed on them, which means that it is both stronger and more reliable security.

§ 2.0 NETWORK COMMUNICATION MODEL

Automated microsegmentation is provided by generating a network communication model by applying machine learning to existing network communications. The resulting model can validate communication between applications (or services) over a network and create network segments. The term "application," as used herein, includes both applications and services. Therefore, any reference herein to an "application" should be understood to refer to an application or a service.

Figure 3:
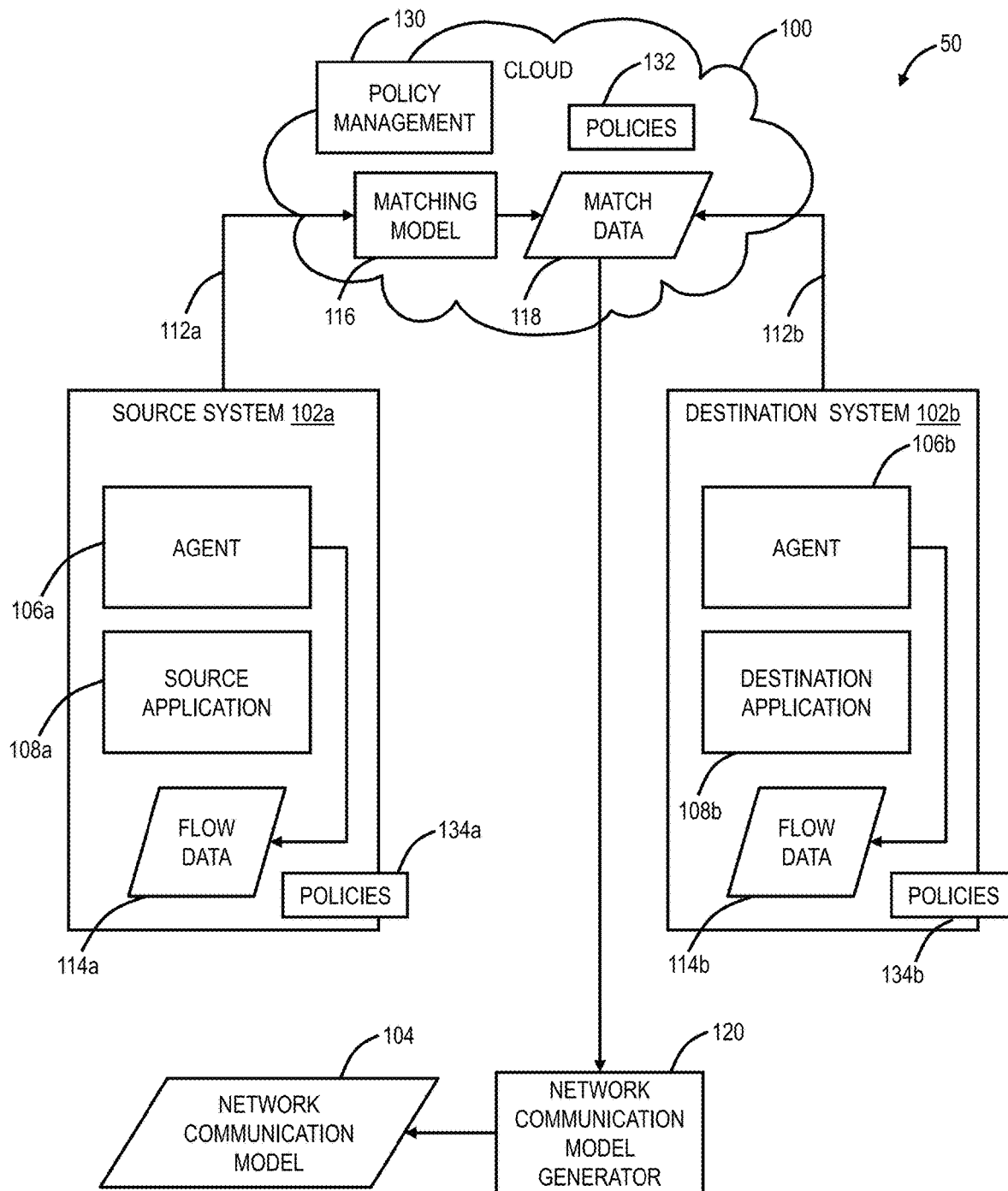
FIG. 3 is a network diagram of a system for generating network application security policies.

FIG. 3 is a network diagram of a system 50 for generating network application security policies. The system 50 includes a cloud-based system 100 configured to collect information about which applications communicate with each other in the system 50. The system 50 can be referred to as a microsegmentation system. An example of the system 50 is the Zscaler Workload Segmentation (ZWS) system available from Zscaler, Inc., the applicant of the present disclosure. Such information includes, for example, identifying information about each such application (such as its name, the machine on which it executes, its network address, and the port on which it communicates). The system 50 can apply machine learning to such gathered information to create a model 104 based on the collected network communication information. The model 104 is generated to have at least two properties, which can be at least in part in conflict with each other: (1) accurately reflect existing network communications, and (2) be in the form of human-readable rules. The model 104 can have each such property to a greater or lesser extent.

As will be described in more detail below, the system 50 can generate the model 104 even in the absence of training data in which particular network communications are labeled as "healthy" (i.e., desired to be permitted) or "unhealthy" (i.e., desired to be blocked). One benefit is that they may generate the model 104 in the absence of such training data, while striking a balance between being permissive enough to permit healthy but previously unseen network communications (e.g., network communications that have properties different than the communications that were used to generate the model 104) and being restrictive enough to block previously-unseen and unhealthy network communications.

The system 50 can include any number of individual systems from which the system 50 may collect network communication information. For ease of illustration and explanation, only two systems, a source system 102a and a destination system 102b, are shown in FIG. 3. In practice, however, the system 50 may include hundreds, thousands, or more such systems, from which the system 50 may collect network communication information using the techniques disclosed herein. A "system," as that term is used herein (e.g., the source system 102a and/or destination system 102b), may be any device and/or software application that is addressable over an Internet Protocol (IP) network. For example, each of the source system 102a and the destination system 102b can be any type of computing device, such as a server computer, desktop computer, laptop computer, tablet computer, smartphone, or wearable computer. The source system 102a and the destination system 102b can have the same or different characteristics. For example, the source system 102a can be a smartphone, and the destination system 102b may be a server computer. A system (such as the source system 102a and/or destination system 102b) can include one or more other systems and/or be included within another system. As merely one example, a system can include a plurality of virtual machines, one of which may include the source system 102a and/or destination system 102b. A "host," as that term is used herein, is an example of a system.

The source system 102a and destination system 102b are labeled as such in FIG. 3 merely illustrates a use case in which the source system 102a initiates communication with the destination system 102b. In practice, the source system 102a can initiate one communication with the destination 102b and thereby act as the source for that communication, and the destination system 102b can initiate another communication with the source system 102a and thereby act as the source for that communication. As these examples illustrate, each of the source system 102a and the destination system 102b may engage in multiple communications with each other and with other systems within the system 50 and can act as either the source or destination in those communications. The system 50 may use the techniques disclosed herein to collect network communication information from any or all such systems.

The source system 102a includes a source application 104a, and the destination system 102b includes a destination application 104b. Each of these applications 104a and 104b can be any kind of application, as that term is used herein. The source application 104a and the destination application 104b can have the same or different characteristics. For example, the source application 104a and destination application 104b can both be the same type of application or even be instances of the same application. As another example, the source application 104a can be a client application, and the destination application 104b can be a server application or vice versa.

Before describing the system 50 in more detail, certain terms will be defined. The system 50 can collect information about applications that communicate with each other over a network within the system 50. The system 50 may, for example, collect such network communication information using a network information collection agent executing on each of one or more systems within the system 50. For example, in FIG. 3, source system 102a includes a network information collection agent 106a and destination system 102*b* includes a network information collection agent 106*b*. The agents 106*a-b* can perform any of the functions disclosed herein for collecting network communication information. The agents 106*a-b* can also be referred to as local security agents, network information collection agents, a combination of local security agents and network information collection agent, or simply agents. The functionality of the agents 106*a-b* is to perform data collection and policy enforcement for the various microsegmentation techniques described herein.

For example, the network information collection agent 106*a* on the source system 102*a* can collect, for each network communication (e.g., connection request, message, packet) transmitted or received by the source system 102*a*, any one or more of the following units of information:

--- the local IP address and port of the communication
the remote IP address and port of the communication
the host (machine) name of the system on which the agent 106a is executing (e.g., the source system 102a)
a unique identifier of the agent 106a (also referred to herein as a "source agent ID" or "local agent ID")
an identifier (e.g., name) of the application transmitting or receiving the communication on the system on which the agent 106a is executing (also referred to herein as a "source application ID" or "local application ID")
a unique identifier of the agent 106b (also referred to herein as a "destination agent ID" or "remote agent ID")
an identifier (e.g., name) of the application transmitting or receiving the communication on the system on which the agent 106b is executing (also referred to herein as a "destination application ID" or "remote application ID")
an identifier (e.g., username) of the user executing the application on the system on which the agent 106a is executing
an identifier (e.g., username) of the user executing the application on the system on which the agent 106b is executing

---

Information about the agents 106*a-b* described above can be used as agent "fingerprints." For example, an agent fingerprint for the agent 106*a* can include any one or more of the following: the agent 106*a*'s IP address, the hostname of the system 102*a* on which the agent 106*a* is executing, and the name and version of the operating system executing on that system. Similarly, an application fingerprint may, without limitation, include any one or more of the following: the name of the application, a full pathname to the binary file of the application; a hash of that binary file which (almost certainly) uniquely identifies the binary file; and a Locality-Sensitive Hash (LSH) of the binary file. The present disclosure can generate, store, read, and write fingerprints for any of the agents and applications disclosed herein.

The network information collection agent 106*a* on the source system 102*a* can transmit a message 112*a* to a cloud-based system 100, containing some or all of the information collected above and/or information derived therefrom. The network information collection agent 106*a* can collect such information for any number of communications (e.g., at least one million, one hundred million, one billion, one hundred billion, or one trillion communications) transmitted and/or received by one or more applications (e.g., source application 108*a*) executing on the source system 102*a*, and transmit any number of instances of message 112*a* (e.g., at least one million, one hundred million, one billion, one hundred billion, or one hundred billion instances of message 112*a*) containing such collected information to the cloud-based system 100 over time (e.g., periodically). In other words, the system 50 can repeat operations for any number of communications at the source system 102*a* over time to collect and transmit network communication information for such communications.

The description above of the functions performed by the network information collection agent 106*a* on the source system 102*a* apply equally to a network information collection agent 106*b* on the destination system 102*b*, which can collect network communication information for any number of communications (e.g., at least one million, one hundred million, one billion, one hundred billion, or one trillion communications) transmitted and/or received by one or more applications (e.g., destination application 108*b*) executing on the destination system 102*b* using any of the techniques disclosed herein, and transmit any number of instances of message 112*b* (e.g., at least one million, one hundred million, one billion, one hundred billion, or one trillion instances of message 112*a*) containing such collected information to the cloud-based system 100 over time (e.g., periodically).

As the system 50 gathers network communication information (e.g., by using the network information collection agents 106*a-b* in the manner disclosed above), the system 50 can store the gathered information. The set of information that the system 50 collects in connection with a particular executing application is referred to herein as a "flow." Any particular application flow may contain information collected from one or more communications transmitted and/or received by that application. The system 50 can combine multiple sequential flows between an application X and an application Y into a single flow (possibly associated with duration). However, communication between application X and another application Z will be in a separate flow, and flows between X and Z, if there is more than one, will be combined separately from flows between X and Y. An example of a flow that may be generated as the result of collecting network communication information for a particular application (e.g., source application 108*a*) is the following: (1) timestamp: 1481364002.234234; (2) id: 353530941; (3) local_address: 149.125.48.120; (4) local_port: 64592; (5) lclass: private; (6) remote_address: 149.125.48.139; (7) remote_port: 62968; (8) rclass: private; (9) hostId: 144; (10) user: USER1; (11) exe: /usr/bin/java; (12) name: java; (13) cmdlineId: 9; (14) duration: 0.0.

As the network information collection agent 106*a* on the source system 102*a* gathers network communication information from network communications sent and received by applications executing on the source system 102*a* (e.g., source application 108*a*), the network information collection agent 106*a* can store such information in the form of flow data 114*a* on the source system 102*a*. The flow data 114*a* can include data representing a flow for each of one or more applications executing on the source system 102*a*. For example, the flow data 114*a* can include flow data representing a flow for the source application 108*a*, where the network information collection agent generated that flow data based on network communication information collected from network communications transmitted and/or received by the source application 108*a*. Instances of the message 112*a* transmitted by the network information collection agent 106*a* to the remote server 110 can include some or all of the flow data 114*a* and/or data derived therefrom.

Similarly, the network information collection agent 106*b* on the destination system 102*b* can generate flow data 114*b* representing a flow for each of one or more applications executing on the destination system 102*b* (e.g., destination application 108*b*), using any of the techniques disclosed herein in connection with the generation of the flow data 114*a* by the network information collection agent 106*a*. Instances of the message 112*b* transmitted by the network information collection agent 106*b* to the cloud-based system 100 may include some or all of the flow data 114*b* and/or data derived therefrom.

The term "flow object," as used herein, refers to a subset of flow data that corresponds to a particular application. For example, one or more flow objects within the flow data 114*a* can correspond to the source application 108*a*, and one or more flow objects within the flow data 114*b* may correspond to the destination application 108*b*. A flow object which corresponds to a particular application may, for example, contain data specifying that the source application 108*a* is the source application of the flow represented by the flow object. As another example, a flow object which corresponds to a particular application may, for example, contain data specifying that the destination application 108*b* is the destination application of the flow represented by the flow object.

Now consider a flow object within the flow data 114*a*, corresponding to the source application 108*a*. Assume that this flow object represents the source application 108*a*'s side of communications between the source application 108*a* and the destination application 108*b*. There is, therefore, also a flow object within the flow data 114*b*, corresponding to the destination application 108*b*'s side of the communications between the source application 108*a* and the destination application 108*b*. Assume that the network information collection agent 106*a* on the source system 102*a* transmits messages 112*a* containing the flow object representing the source application 108*a*'s side of its communications with the destination application 108*b* and that the network information collection agent 106*b* on the destination system 102*b* transmits messages 112*b* contain the flow object representing the destination application 108*b*'s side of its communications with the source application 108*a*. As a result, the cloud-based system 100 receives and can store information about both the flow object corresponding to the source application 108*a* and the flow object corresponding to the destination application 108*b*.

These two flow objects, which correspond to the two ends of an application-to-application communication (i.e., between the source application 108*a* and the destination application 108*b*), can match up or correlate with each other in a variety of ways. For example, the local IP address and port of the flow object corresponding to the source application 108*a* is the same as the remote IP address and port, respectively, of the flow object corresponding to the destination application 108*b*, and vice versa. In other words, the flow object corresponding to the source application 108*a* can contain data specifying a particular remote IP address and port, and the flow object corresponding to the destination application 108*b* can contain data specifying the same remote IP address and port as the flow object corresponding to the source application 108*a*. Various other data within these two flow objects may match up with each other as well.

A matching module 116 in the cloud-based system 100 can identify flow objects that correspond to the two ends of an application-to-application communication and then combine some or all of the data from the two flow objects into a combined data structure that is referred to herein as a "match object," which represents what is referred to herein as a "match." A "match," in other words, represents the two corresponding flows at opposite (i.e., source and destination) ends of an application-to-application communication.

More generally, the matching module 116 can receive collected network information from a variety of systems within the system 50, such as by receiving network information messages 112*a* from the source system 102*a* and network information messages 112*b* from the destination system 102*b*. As described above, these messages 112*a-b* can contain flow data representing information about flows in the source system 102*a* and destination system 102*b*, respectively. The matching module 116 can then analyze the received flow data to identify pairs of flow objects that represent opposite ends of application-to-application communications. For each such identified pair of flow objects, the matching module 116 can generate a match object representing the match corresponding to the pair of flow objects. Such a match object may, for example, contain the combined data from the pair of flow objects.

The matching module 116 can impose one or more additional constraints on pairs of flow objects in order to conclude that those flow objects represent a match. For example, the matching module 116 can require that the transmission time of a source flow object (e.g., in the source flow data 114*a*) and the receipt time of a destination flow object (e.g., in the destination flow data 114*b*) differ from each other by no more than some maximum amount of time (e.g., 1 second) in order to consider those two flow objects to represent a match. If the difference in time is less than the maximum permitted amount of time, then the matching module 116 may treat the two flow objects as representing a match; otherwise, the matching module 116 may not treat the two flow objects as representing a match, even if they otherwise satisfy the criteria for a match (e.g., matching IP addresses).

The system 50 also includes a network communication model generator 120, which receives the match data 118 as input and generates the network communication model 104 based on the match data 118. Because the matches represent flows, which in turn represent actual communications within the network, the network communication model generator 120 generates the network communication model 104 based on actual communications within the network.

As mentioned above, the network communication model generator 120 can generate the network communication model 104 with the following constraints:
  (1) The rules in the model 104 should accurately reflect the actually observed network communications, as represented by the match data 118.
  (2) The match data 118 can be the sole source of the data that the network communication model generator 120 uses to generate the network communication model 104, and the match data 118 may not contain any labels or other a priori information about which communications represented by the match data 118 are healthy or unhealthy. The network communication model generator 120 can, therefore, learn which observed communications are healthy and which are unhealthy without any such a priori information. This is an example of an "unsupervised" learning problem.

(3) The resulting rules in the network communication model 104 should allow for natural generalizations of the observed network communications represented by the match data 118, but not allow novel applications to communicate on the network without constraint. The rules, in other words, should minimize the number of misses (i.e., unhealthy communications which the model 104 does not identify as unhealthy), even though the match data 118 may represent few if any, unhealthy communications and any unhealthy communications which are represented by the match data 118 may not be labeled as such.

(4) The model 104 should be in a form that humans can read, understand, and modify, even if doing so requires significant dedication and attention. Most existing machine learning algorithms are not adequate to produce rules which satisfy this constraint, because they tend to create complex, probabilistic outputs that people—even experts—find daunting even to understand, much less to modify.

(5) The match data 118 can contain billions of matches, resulting from months of matches collected from a medium-to-large corporate network containing thousands of systems. The network communication model generator 120, therefore, should be capable of processing such "big data" to produce the network communication model 104. It may not, for example, be possible to load all of the match data 118 into memory on a single computer. As a result, it may be necessary to use one or both of the following:

(a) Algorithms that process the match data 118 in a distributed fashion, such as MapReduce.

(b) Algorithms that process data in a streaming fashion by using a processor to sequentially read the data and then to update the model 104 and then forget (e.g., delete) the data that it has processed.

Not all embodiments need to satisfy, or even attempt to satisfy, all of the constraints listed above. Certain embodiments of the present invention may, for example, only even attempt to satisfy fewer than all (e.g., two, three, or four) of the constraints listed above. Regardless of the number of constraints that a particular embodiment attempts to satisfy, the embodiment may or may not satisfy all such constraints in its generation of the resulting model 104 and may satisfy different constraints to greater or lesser degrees. For example, the model 104 that results from some embodiments may be easily understandable and modifiable by a human, while the model 104 that results from other embodiments of the present invention may be difficult for a human to understand and modify.

The resulting model 104 can, for example, be or contain a set of rules, each of which may be or contain a set of feature-value pairs. A rule within the model 104 may, for example, contain feature-value pairs of the kind described above in connection with an example flow (e.g., timestamp: 1481364002.234234; id: 353530941). The term "accept" is used herein in connection with a rule R and a match M as follows: a rule R "accepts" a match M if, for each feature-value pair (F, V) in rule R, match M also contains the feature F with the value V. As a result, rule R will accept match M if the set of feature-value pairs in rule R is a subset of the set of feature-value pairs in match M. Furthermore, if at least one rule in the model 104 accepts match M, then the match is accepted by the set of rules.

§ 3.0 NETWORK COMMUNICATION POLICIES

With the resulting model 104, the system 50 can utilize a policy management engine 130 to develop policies 132, 134a, 134b for acceptable network communication, i.e., for microsegmentation. The policy management engine 130 can receive the model 104. The model 104 includes state information that can include both application state information and network topology information (e.g., addresses, listening ports, broadcast zones). The policy management engine 130 can, for example, store such state information in a log (e.g., database) of state information received from one or more local security agents (e.g., agents 106a-b) over time. Such a log can include, for each unit of state information received, an identifier of the system (e.g., source system 102a or destination system 102b) from which the state information was received. In this way, the policy management engine 130 can build and maintain a record of application state and network configuration information from various systems over time.

The policy management engine 130 can include or otherwise have access to a set of policies 132, which may be stored in the cloud-based system 100. In general, each of the policies 132 specifies both a source application and a destination application and indicates that the source application is authorized (or not authorized) to communicate with the destination application. A policy may specify, for the source and/or destination application, any number of additional attributes of the source and/or destination application, such as any one or more of the following, in any combination: user(s) who are executing the application (identified, e.g., by username, group membership, or another identifier), system(s), network subnet, and time(s). A policy can identify its associated source and/or destination application by its name and any other attribute(s) which may be used to authenticate the validity and identify of an application, such as any one or more of the following in any combination: filename, file size, a cryptographic hash of contents, and digital code signing certificates associated with the application. A policy can include other information for its associated source and/or destination application, such as the IP address and port used by the application to communicate, whether or not such information is used to define the application.

The policy management engine 130 provides, to one or more systems in the system 50 (e.g., the source system 102a and destination system 102b), policy data, obtained and/or derived from the policies, representing some or all of the policies that are relevant to the system to which the policy data is transmitted, which may include translating applications into IP address/port combinations. For example, the policy management engine 130 can identify a subset of the policies 132 that are relevant to the source system 102a and the destination system 102b and transmit policies 134a, 134b accordingly. The systems 102a, 102b receive and store the policies 134a, 134b. The policy management engine 130 can identify the subset of the policies 132 that are relevant to a particular system (e.g., the source system 102a and/or the destination system 102b) in any of a variety of ways, including based on the model 104.

The policy management engine 130 can extract the policy data that is relevant to the systems 102a, 102b in response to any of a variety of triggers, such as periodically (e.g., every second, every minute, or at any scheduled times); in response to a change in the master policy data; in response to a change in network topology, e.g., an assignment of a network address to one of the systems 102*a-b* or a change in an assignment of an existing address; in response to a new application executing on one of the systems 102*a-b*; in response to an existing application in the system 50 changing or adding a port on which it is listening for connections; and in response to an unexpected condition on systems 102*a-b* or other systems in the network.

The system 50 can operate in one of at least three security modes in relation to any particular connection between two applications (e.g., the source application 104*a* and the destination application 104*b*):

(1) Optimistic: The connection between the two applications is allowed unless and until a reconciliation engine instructs the agents 106*a-b* associated with those applications to terminate the connection due to a policy violation.

(2) Pessimistic: The connection between the two applications is terminated after a specified amount of time has passed if the reconciliation engine does not affirmatively instruct the agents associated with those applications to keep the connection alive.

(3) Blocking: The connection between the two applications is blocked unless and until the reconciliation engine affirmatively instructs the agents associated with those applications to allow the connection.

Note that the system 50 may, but need not, operate in the same security mode for all connections within the system 50. The system 50 can, for example, operate in optimistic security mode for some connections, operate in pessimistic security mode for other connections, and operate in blocking security mode for yet other connections. As yet another example, the system 50 can switch from one mode to another for any given connection or set of connections in response to detected conditions, as will be described in more detail below.

§ 4.0 AUTOMATED MICROSEGMENTATION

With the network communication model 104 and the network communication policies 132, the system 50 can include automatic microsegmentation, as illustrated in FIG. 2. Of note, machine learning is ideal for detecting normal (healthy) and abnormal (unhealthy) communications and is ideal for automating microsegmentation. That is, the model 104 and the policies 132 can be used to automatically create microsegments in the system 50.

Figure 4:
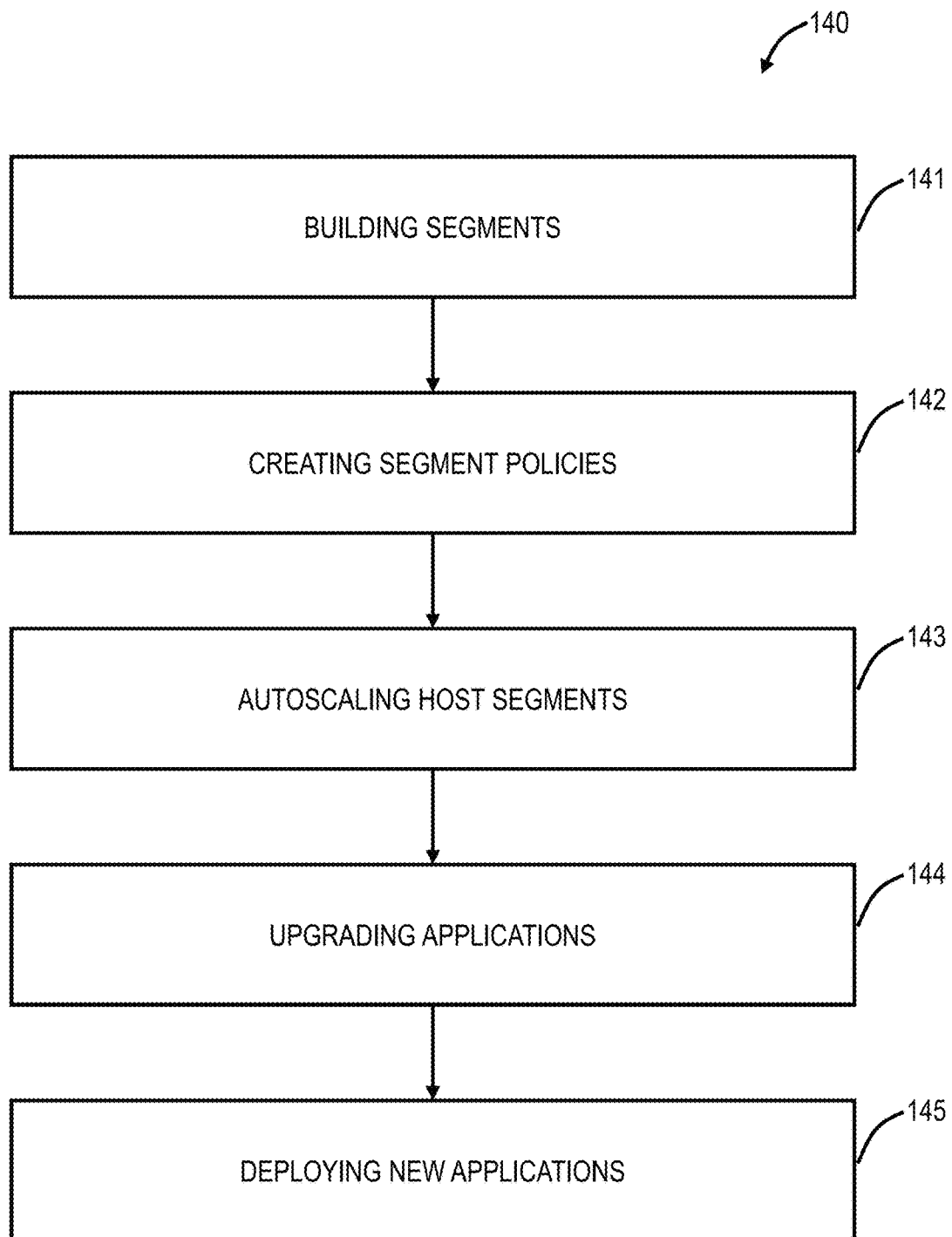
FIG. 4 is a flowchart of an automated microsegmentation process.

FIG. 4 is a flowchart of an automated microsegmentation process 140. The automated microsegmentation process 140 contemplates operation via the system 50. The automated microsegmentation process 140 includes building segments (step 141), creating segment policies (step 142), autoscaling host segments (step 143), upgrading applications (step 144), and deploying new applications (step 145). The steps 141, 142 can be implemented via the cloud-based system 100 based on the communications in the system 50. These steps include machine learning to develop the model 104 and the policies 132. After steps 141, 142, the automated microsegmentation process 140 contemplates dynamic operation to autoscale segments as needed, and to identify upgraded applications and newly deployed applications.

The system 50 and the automated microsegmentation process 140 advantageously performs the vast majority of the work required to microsegment the network automatically, possibly leaving only the task of review and approval to the user. This saves a significant amount of time and increases the quality of the microsegmentation compared to microsegmentation solely performed manually by one or more humans.

In general, automated microsegmentation process 140 can perform some or all of the following steps to perform microsegmenting of a network:

(a) Automatically surveying the network to find its functional components and their interrelations.

(b) Automatically creating one or more subgroups of hosts on the network, where each subgroup corresponds to a functional component. Each such subgroup is an example of a microsegment. A functional component may, for example, be or include a set of hosts that are similar to each other, as measured by one or more criteria. In other words, all of the hosts in a particular functional component may satisfy the same similarity criteria as each other. For example, if a set of hosts communicate with each other much more than expected, in comparison to how much they communicate with other hosts, then embodiments can define that set of hosts as a functional component and as a microsegment. As another example, if hosts in a first set of hosts communicate with hosts in a second set of hosts, then embodiments can define the first set of hosts as a functional component and as a microsegment, whether or not the first set of hosts communicates amongst themselves. As yet another example, embodiments can define a set of hosts that have the same set of software installed on them (e.g., operating system and/or applications) as a functional component and as a microsegment. "Creating," "defining," "generating," "identifying" a microsegment may, for example, include determining that a plurality of hosts satisfy particular similarity criteria, and generating and storing data indicating that the identified plurality of hosts form a particular microsegment.

(c) For each microsegment identified above, automatically identifying existing network application security policies that control access to hosts in that microsegment. For example, embodiments of the present invention may identify existing policies that govern (e.g., allow and/or disallow) inbound connections (i.e., connections into the microsegment, for which hosts in the microsegment are destinations) and/or existing policies that govern (e.g., allow and/or disallow) for outbound connections (i.e., connections from the microsegment, for which hosts in the microsegment are sources). If the microsegmentation(s) were generated well, then the identified policies may govern connections between microsegments, in addition to individual hosts inside and outside each microsegment.

(d) Providing output to a human user representing each defined microsegment, such as by listing names and/or IP addresses of the hosts in each of the proposed microsegments. This output may be provided, for example, through a programmatic Application Program Interface (API) to another computer program or by providing output directly through a user interface to a user.

(e) Receiving input from the user in response to the output representing the microsegment. If the user's input indicates approval of the microsegment, then embodiments of the present invention may, in response, automatically enforce the identified existing network application policies that control access to hosts in the now-approved microsegment. If the user's input does not indicate approval of the microsegment, then embodiments of the present invention may, in response, automatically not enforce the identified existing network application policies that control access to hosts in the now-approved microsegment.

In prior art approaches (FIG. 1), most or all steps in the microsegmenting process are performed manually and can be extremely tedious, time-consuming, and error-prone for humans to perform. When such functions are otherwise attempted to be performed manually, they can involve months or even years of human effort, and often they are never completed. One reason for this is the task's inherent complexity. Another reason is that no network is static; new hosts and new functional requirements continue to rise over time. If microsegmentation policies are not updated over time, those new requirements cannot be satisfied, and the existing microsegmentations become obsolete and potentially dangerously insecure.

Embodiments of the present invention improve upon the prior art by performing a variety of functions above automatically and thereby eliminating the need for human users to perform those functions manually, such as:

automatically defining the sets of source and destination network host-application pairs that are involved in the policies to be applied to the microsegment;

automatically establishing the desired behavior in the microsegment, including but not limited to answering the questions: (a) are the policies that apply to the microsegment intended to allow or to block communications between the two host-application sets; and (b) are the policies that apply to the microsegment intended to allow or block communications within the host-application sets?; and automatically configuring and applying rules for each of the desired behaviors above so that they can be executed by the agents on the hosts. The automated microsegmentation process 140 can repeat multiple times over time: identifying (or updating existing) microsegments; identifying updated network application security policies and applying those updated policies to existing or updated microsegments; prompting the user for approval of new and/or updated microsegments; and applying the identified network application security policies only if the user approves of the new and/or updated microsegments.

§ 5.0 EXAMPLE CLOUD-BASED SYSTEM ARCHITECTURE

Figure 5:
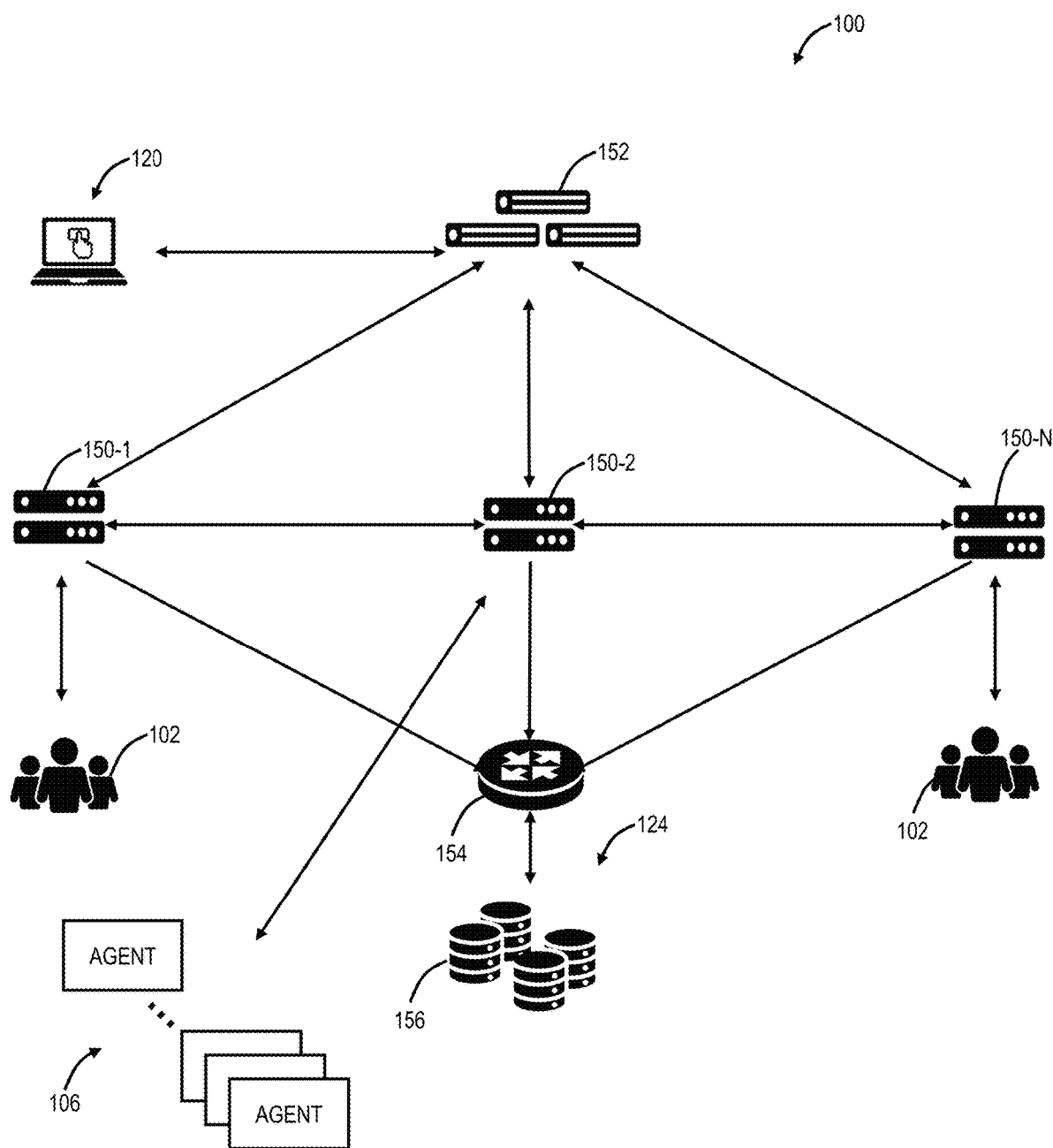
FIG. 5 is a network diagram of a cloud-based system offering security as a service.

FIG. 5 is a network diagram of a cloud-based system 100 offering security as a service. Specifically, the cloud-based system 100 can offer a Secure Internet and Web Gateway as a service to various users 145 (e.g., the systems 102a-b), as well as other cloud services. In this manner, the cloud-based system 100 is located between the users 145 and the Internet as well as any cloud services (or applications) accessed by the users 145. As such, the cloud-based system 100 provides inline monitoring inspecting traffic between the users 145, the Internet, and the cloud services, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 145. As such, newly discovered threats can be promulgated throughout the cloud-based system 100 for all tenants practically instantaneously. The antivirus protection can include antivirus, antispyware, antimalware, etc. protection for the users 145, using signatures sourced and constantly updated. The DNS security can identify and route command-and-control connections to threat detection engines for full content inspection.

The DLP can use standard and/or custom dictionaries to continuously monitor the users 145, including compressed and/or SSL-encrypted traffic. Again, being in a cloud implementation, the cloud-based system 100 can scale this monitoring with near-zero latency on the users 145. The cloud application security can include CASB functionality to discover and control user access to known and unknown cloud services 106. The file type controls enable true file type control by the user, location, destination, etc. to determine which files are allowed or not.

Figure 6:
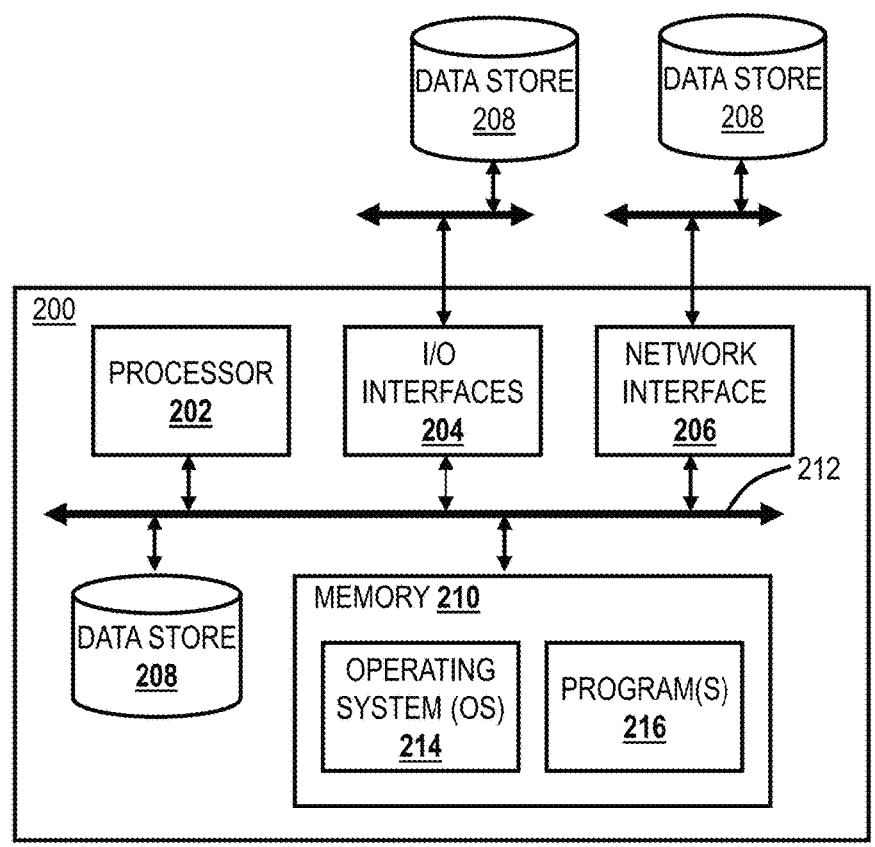
FIG. 6 is a block diagram of a server.

In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 6. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 145 and are configured to execute policy, based on the central authority 152, for each user 145. The enforcement nodes 150 can be geographically distributed, and the policy for each user 145 follows that user 145 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 145 are, they can access the Internet from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 145 and sends the policy to the enforcement node 150 as a highly compressed bitmap.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. A cloud service is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated. Also, other types of cloud architectures are also contemplated, with the cloud-based system 100 presented for illustration purposes.

The cloud-based system 100 can communicate with a plurality of agents 106 in the system 50 to provide microsegmentation as a service. Also, the cloud-based system 100 can include a management interface 158 for IT users to interact with the system 50.

In the present disclosure, the cloud-based system 100 can be used to provide some service to users in a serverless computing manner, from the perspective of the users. In such a case, serverless applications 108 operating in the serverless computing manner will not have the agents 106. As is described in detail herein, the serverless applications 108 will have a networking ACL, or simply ACL, associated therewith, and the microsegmentation as a service is provided through configuration of this ACL appropriately.

§ 6.0 EXAMPLE SERVER ARCHITECTURE

FIG. 6 is a block diagram of a server 200, which may be used in the cloud-based system 100, in other systems, or standalone. For example, the enforcement nodes 150 and the central authority 152 may be formed as one or more of the servers 200. Further, the systems 102*a-b* may also have a similar architecture as the server 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 200 in an oversimplified manner, and a practical embodiment may include additional components and suitably configured processing logic to support known or conventional operating features that are not described in detail herein. Also, the server 200, in general, may be referred to as a processing device. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 7.0 FINGERPRINTING

In an embodiment, the system 50 can include cryptographic identity of workloads for identifying communications, authorizing communications, etc. The cryptographic identity is used to verify software and/or machine identity, i.e., the identify of the applications 108 and the identity of the systems 102. The cryptographic identity can be referred to as a device or application fingerprint. Importantly, the cryptographic identity is based on multiple characteristics to ensure unique identification and prevent spoofing. The cryptographic identity can based on a combination of any of the following:

| Software | Host | Network |
|---|---|---|
| Hash (SHA256) | Operating System | Network namespace |
| Locality Sensitive Hash (LSH) | Provisioned Hostname | IP Address |
| Executable Signing Portable Executable (PE) Header values | BIOS UUID CPU Serial numbers | Port Protocol |
| Process Identifiers Container/Image ID | User ID Other hardware parameters | MAC Address |

Figure 7:
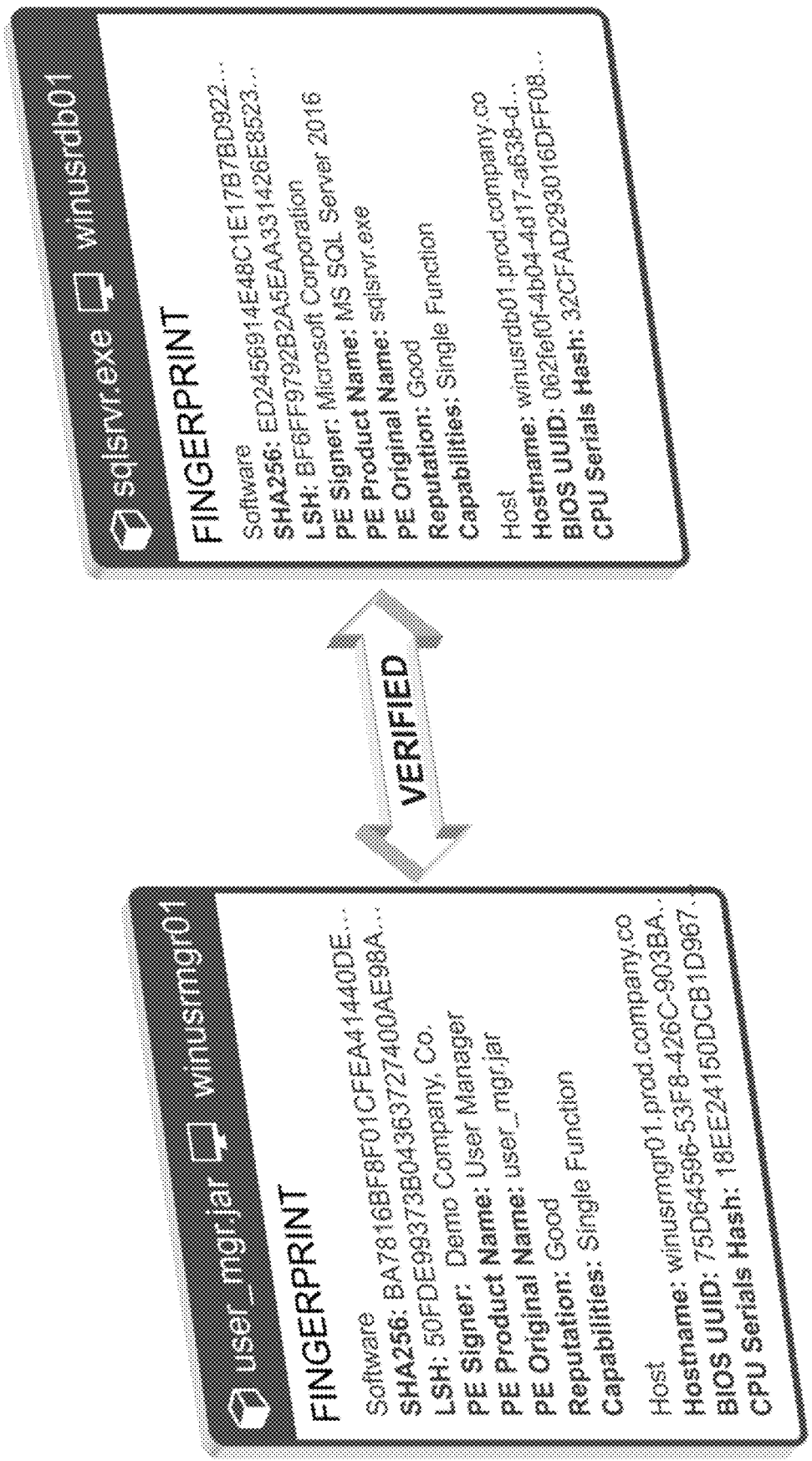
FIG. 7 is a block diagram of two systems communicating to one another and their example cryptographic identities, i.e., fingerprints.

Also, the cryptographic identity can include values based on Software Reputation, Behavioral Scoring, Capabilities Classification, and the like. FIG. 7 is a block diagram of two systems 102 communicating to one another and their example cryptographic identities, i.e., fingerprints. A key aspect of the cryptographic identity is its resilience to software upgrades and Continuous Integration/Continuous Deployment (CI/CD).

For example, a descriptive of device fingerprinting is provided in commonly assigned U.S. Patent Publication No. 20200077265, filed Nov. 5, 2019, and entitled "Device identification for management and policy in the cloud," the contents of which are incorporated by reference in their entirety.

§ 8.0 SEGMENT NAMING

Again, the microsegmentation described herein describes the automatic generation of segments for zero trust between hosts and between applications. The following descriptions use the terms hosts and applications. As described herein, the hosts are the systems 102, the servers 200, etc. A host is any type of computing device on a network and part of the system 50 and including the agent 106. Those of ordinary skill in the art will recognize a host can include a server computer, desktop computer, laptop computer, tablet computer, smartphone, wearable computer, database, storage cluster, Internet of Things (IoT) device, printer, and the like. As described herein, the applications are executed on the hosts and can include the applications 108. The applications 108 can be anything that generates network communication data and is used for microsegmentation.

The foregoing describes the ability to create groups (segments) of hosts (i.e., the systems 102) and groups (collections) of applications 108. There is a need for management to provide a human-readable name for the automatically generated segments, especially segments between hosts. Problematically, the raw materials do not make this simple or easy to understand. The easiest source of information is the name of the individual hosts. That is, the name that the host calls itself, i.e., the hostname. However, those need only be random strings (e.g., DESKTOP-RGK97GG), unless someone (an administrator) cares enough to make them informative. Even if the hostnames contain human intention information, it is not obvious how to (a) recognize that intention (this is pretty much an Artificial Intelligence (AI)-complete problem) and/or (b) how to combine those strings to make another string that describes the hosts in the segment collectively. Another source of information is the name that other hosts use to refer to a host. There may be several of these, assigned by a centralized Domain Name Controller (DNC). The problem is the system 50 for microsegmentation does not necessarily have access to the DNC.

Again, as described in the background and FIG. 1, the manual approach to microsegmentation is time-consuming, changes often as the network evolves, and prone to mistakes. The present disclosure contemplates automated microsegmentation. However, network administrators (i.e., IT personnel) may be uncomfortable with turning network microsegmentation control over to an automated process. To that end, the present disclosure provides an automatic network segment naming approach. Again, advantageously, providing a meaningful name encourages network administrators to utilize the automation of microsegmentation as they can understand and manage the various automatically created segments.

§ 8.1 Automated Microsegmentation and Segment Naming Process

Figure 8:
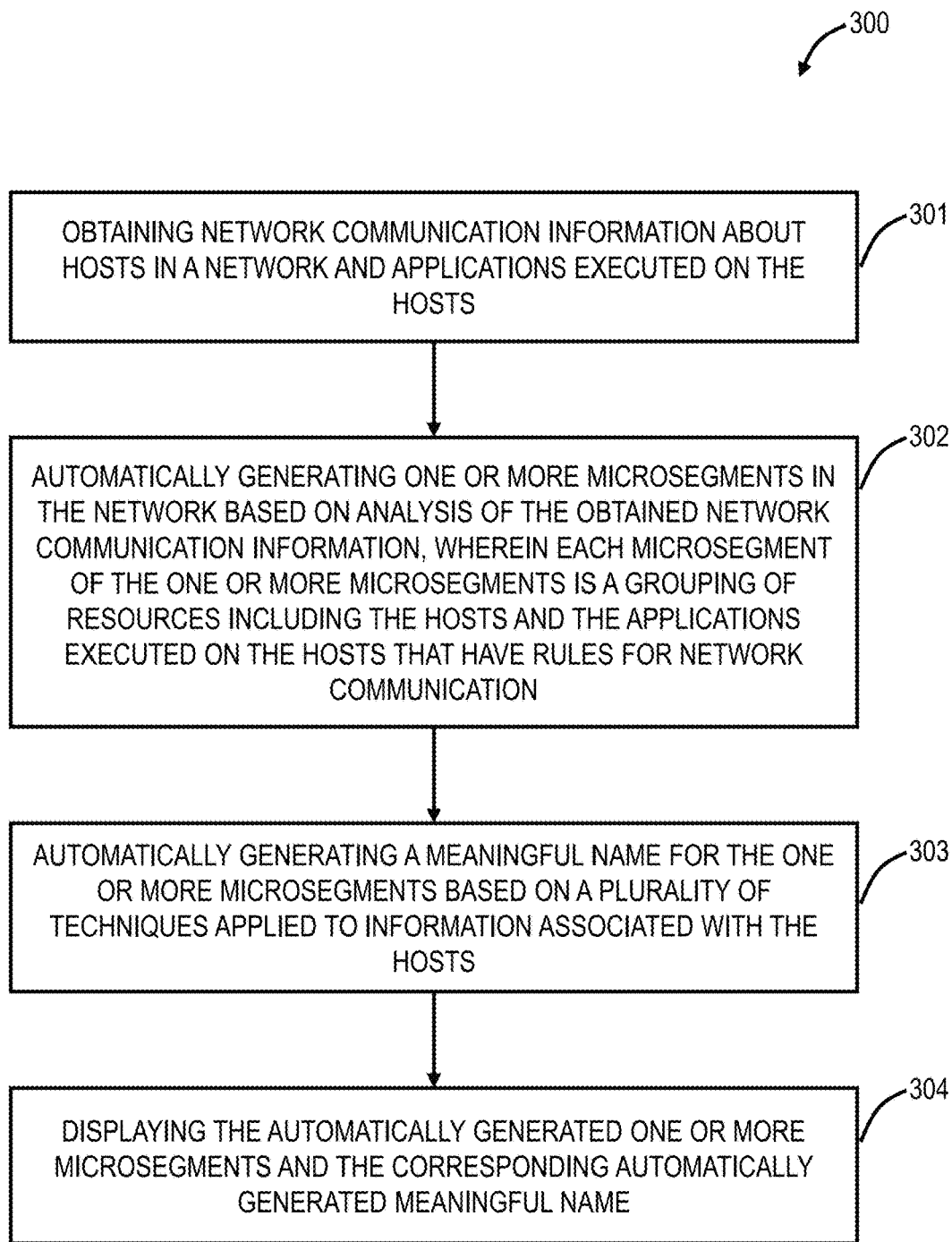
FIG. 8 is a flowchart of an automated microsegmentation and segment naming process.

FIG. 8 is a flowchart of an automated microsegmentation and segment naming process 300. The automated microsegmentation and segment naming process 300 can be implemented as a method, as a non-transitory computer-readable medium storing computer-executable instructions that, when executed, cause a processor to perform the steps, via the system 50 for generating network application security policies, and/or via the cloud-based system 100. The automated microsegmentation and segment naming process 300 includes obtaining network communication information about hosts in a network and applications executed on the hosts (step 301); automatically generating one or more microsegments in the network based on analysis of the obtained network communication information, wherein each microsegment of the one or more microsegments is a grouping of resources including the hosts and the applications executed on the hosts that have rules for network communication (step 302); automatically generating a meaningful name for the one or more microsegments based on a plurality of techniques applied to information associated with the hosts (step 303); and displaying the automatically generated one or more microsegments and the corresponding automatically generated meaningful name (step 304).

The automated microsegmentation and segment naming process 300 can further include obtaining updated network communication information about the hosts and the applications; and updating the automatically generated one or more microsegments and/or generating new microsegments in the network based on analysis of the obtained updated information. That is, because of the automated nature, the automated microsegmentation and segment naming process 300 can operate continuously, periodically, on demand, etc. to update the network 10 and the associated segments. The automated microsegmentation and segment naming process 300 can further include providing details of the one or more microsegments and the rules to the hosts and/or applications in the network. Each of the hosts can include an agent executed thereon that provides the information to the processing device. The agent is configured to enforce the rules for network communication.

The plurality of techniques can include any of use of a string similarity among hostnames of the hosts in a given microsegment, use of metadata, excluding hostnames, associated with the hosts, and use of names of the applications in a given microsegment. The string similarity can include first utilizing a largest substring all the hosts in the given microsegment share, and second utilizing one of a second substring if the largest substring is shared by other segments and the largest substring plus an additional string appended thereto if the largest substring is shared by other segments.

For string similarity among hostnames, suppose, for a host segment, there is a list of the hostnames that hosts have for themselves. It is possible to look for the shared substrings that those hostnames share. For example, if there was a host segment with four hosts with the hostnames:

SFO-BACKUP-DB-1
SFO-PROCESSING-1
SFO-SERVER-1
SFO-DATABASE-1

It is possible to decide that "SFO-" was a reasonable name for this host segment, since it is the largest substring that all the hosts share. Also, there might be other conditions that the substring should satisfy (initialness, meaningfulness, length, alphabetic characters, etc.) to make it more valuable as a name. That is, this technique can parse for the largest substring that is shared. It can also look for the largest substring that may be shared by the most hosts, i.e., not all hosts must include this substring. It is also that it may be a subset of this largest substring that satisfies the other conditions. In the above example, the largest substring "SFO-" may be shortened to "SFO," i.e., removal of the "-" as this does not convey any meaningful information.

This largest substring might also be affected by names given to other host segments. If more than one host segment has "SFO-" (or "SFO") as an assigned name, then there is a need to distinguish them in some other way. One way is to choose the next most valuable substring name for one of the host segments, if one of the host segments has a second-most valuable name that is not much worse than the most valuable one. Alternatively, it is possible to append something random to the segment names, to distinguish them. It is preferable to fall back to a second-best name if there is one and it is "good enough" and it is distinct from all the other selected names. It is possible to use a "cuckoo" process here: that is, if there is a need to change segment A's name, and A's new name is similar to segment B's name, then adopt that new name for segment A and also force segment B to change its name. (And, possibly, so on, until the naming process stabilizes.)

Also, the techniques can use other host information besides the hostname. There are a couple of other sources for name information from which it is possible to create meaningful segment names. One type of source is host metadata, such as IP addresses, host Operating System names, DNS information, etc.

Another type of information is the set of communicating applications on each host. In particular, the traffic among the hosts in the segment is known as is the traffic from the hosts in the segment to hosts outside the segment. It is possible to combine these to find a combination of application names that characterize the host segment—in terms of what applications are commonly communicating within the segment, and which applications are communicating from the segment to other segments.

§ 9.0 AUTO SEGMENTATION

In an embodiment, the cloud-based system 100 (or some other computer system) automatically generates a proposal for performing microsegmentation on a network. The system 100 provides output representing the proposed microsegmentation to a user. The user provides input either approving or disapproving of the proposed microsegmentation. If the user approves of the proposed microsegmentation, then the system 100 implements the microsegmentation. This process may be repeated for a plurality of proposed microsegmentations within the same network, and may be repeated over time to modify one or more existing microsegmentations. The system 100 advantageously performs the vast majority of the work required to microsegment the network automatically, leaving only the task of review and approval to the user; of course, this user approval step can be omitted for auto segmentations. This both saves a significant amount of time and increases the quality of the microsegmentation in comparison to microsegmentation solely performed manually by one or more humans.

This application is related to the following patent applications, both of which are incorporated by reference herein:
- application Ser. No. 15/883,534, filed on Jan. 30, 2018, entitled, "Network Application Security Policy Enforcement," now U.S. Pat. No. 10,154,067, issued on Dec. 11, 2018 (hereinafter "the Policy Enforcement Patent"); and
- U.S. patent application Ser. No. 15/899,453, filed on Feb. 20, 2018 entitled, "Network Application Security Policy Generation," now U.S. Pat. No. 10,439,985, issued on Oct. 8, 2019 (hereinafter "the Policy Generation Patent").

As described in the Policy Enforcement Patent and the Policy Generation Patent, information may be collected automatically about applications executing on a network, and network security policies may be generated automatically based on the collected information. Such policies may then be enforced at the application and host level within the network. As will be described in more detail below, embodiments may group such policies together to define and secure a proposed microsegment (also referred to herein as a "microsegmentation"), which may then be put into effect without requiring human effort except maybe for a review and approval of the proposed microsegment. Such approval may include as little as a single gesture (such as a single click or tap on a user interface element, such as an "OK" button), hitting a single key, or typing or speaking a single word or phrase.

In general, embodiments may perform some or all of the following steps to perform microsegmenting of a network:
(a) Automatically surveying the network to find its functional components and their interrelations.
(b) Automatically creating one or more subgroups of hosts on the network, where each subgroup corresponds to a functional component. Each such subgroup is an example of a microsegment. A functional component may, for example, be or include a set of hosts that are similar to each other, as measured by one or more criteria. In other words, all of the hosts in a particular functional component may satisfy the same similarity criteria as each other. For example, if a set of hosts communicate with each other much more than expected, in comparison to how much they communicate with other hosts, then embodiments of the present invention may define that set of hosts as a functional component and as a microsegment. As another example, if hosts in a first set of hosts communicate with hosts in a second set of hosts, then embodiments of the present invention may define the first set of hosts as a functional component and as a microsegment, whether or not the first set of hosts communicates amongst themselves. As yet another example, embodiments of the present invention may define a set of hosts that have the same set of software installed on them (e.g., operating system and/or applications) as a functional component and as a microsegment. "Creating," "defining," "generating," "identifying" a microsegment may, for example, include determining that a plurality of hosts satisfy particular similarity criteria, and generating and storing data indicating that the identified plurality of hosts form a particular microsegment.
(c) For each microsegment identified above, automatically identifying existing network application security policies that control access to hosts in that microsegment. For example, embodiments of the present invention may identify existing policies that govern (e.g., allow and/or disallow) inbound connections (i.e., connections into the microsegment, for which hosts in the microsegment are destinations) and/or existing policies that govern (e.g., allow and/or disallow) for outbound connections (i.e., connections from the microsegment, for which hosts in the microsegment are sources). If the microsegmentation(s) were generated well, then the identified policies may govern connections between microsegments, in addition to individual hosts inside and outside each microsegment.
(d) Providing output to a human user representing each defined microsegment, such as by listing names and/or IP addresses of the hosts in each of the proposed microsegments. This output may be provided, for example, through a programmatic API to another computer program or by providing output directly through a user interface to a user.
(e) Receiving input from the user in response to the output representing the microsegment. If the user's input indicates approval of the microsegment, then embodiments of the present invention may, in response, automatically enforce the identified existing network application policies that control access to hosts in the now-approved microsegment. If the user's input does not indicate approval of the microsegment, then embodiments of the present invention may, in response, automatically not enforce the identified existing network application policies that control access to hosts in the now-approved microsegment.

Conventionally, most or all steps in the microsegmenting process are performed manually and can be extremely tedious, time-consuming, and error prone for humans to perform. Embodiments of the present invention improve upon the prior art by performing a variety of functions above automatically and thereby eliminating the need for human users to perform those functions manually, such as:
- automatically defining the sets of source and destination network host-application pairs that are involved in the policies to be applied to the microsegment;
- automatically establishing the desired behavior in the microsegment, including but not limited to answering the questions: (a) are the policies that apply to the microsegment intended to allow or to block communications between the two host-application sets; and (b) are the policies that apply to the microsegment intended to allow or block communications within the host-application sets?; and
- automatically configuring and applying rules for each of the desired behaviors above so that they can be executed by the agents on the hosts.

More specifically, embodiments automatically identify proposed microsegments, and then:
Receive input from the user indicating whether the user approves of each proposed microsegment. Such input may, for example, be binary for each microsegment, such as an input indicating "approve" or "disapprove." The input may consist of a single gesture, such as a single click or tap (e.g., on an "approve" or "OK" button). The user may provide separate input for each of one or more of the proposed microsegments, or may provide a single input that applies to some or all of the proposed microsegments. For example, the user may provide a single "approve" input that applies to all of the proposed microsegments.

In response to receiving input from the user approving of one or more proposed microsegments, enforcing the policies that define and protect the approved microsegment(s).

Because embodiments perform the functions above automatically (i.e., without human intervention), the human user need only review the proposed microsegment(s) and approve or disapprove of them. When such functions are otherwise attempted to be performed manually, they can involve months or even years of human effort, and often they are never completed. One reason for this is the task's inherent complexity. Another reason is that no network is static; new hosts and new functional requirements continue to arise over time. If microsegmentation policies are not updated over time, those new requirements cannot be satisfied, and the existing microsegmentations become obsolete and potentially dangerously insecure.

To address changing hosts, network topologies, and network application security policies over time, embodiments may repeat any of the methods disclosed herein over time. For example, embodiments may repeat the methods disclosed herein to perform any one or more of the following functions multiple times over time:
    identifying (or updating existing) microsegments;
    identifying updated network application security policies and applying those updated policies to existing or updated microsegments;
    prompting the user for approval of new and/or updated microsegments; and
    applying the identified network application security policies only if the user approves of the new and/or updated microsegments.

As just one example, embodiments may, at a first time, perform methods disclosed herein to create and receive the user's approval of a particular microsegment and, in response to that approval, apply identified network application security policies to that particular microsegment. Embodiments may then, at a second time that is later than the first time, perform methods disclosed herein to identify an updated version of a previously-approved microsegment (such as a version in which one or more hosts have been added to the microsegment). Embodiments may prompt the user for approval of the updated microsegment. If the user's input indicates approval of the updated microsegment, then embodiments of the present invention may apply the identified network application security policies to the updated microsegment. If, however, the user's input indicates disapproval of the updated microsegment, then embodiments may not apply the identified network application security policies to the updated microsegment. This is an example in which embodiments may (in response to user approval) apply network application security policies to an earlier version of a microsegment but not (in response to user disapproval) apply those (or different0 network application security policies to a later version of the microsegment.

Embodiments may make use of the technology disclosed in the above referenced Policy Enforcement Patent and Policy Generation Patent. Those documents disclose how to perform functions such as collecting application and host data, creating microsegments (also referred to therein as "collections") and policies, and enforcing those policies.

Figure 9:
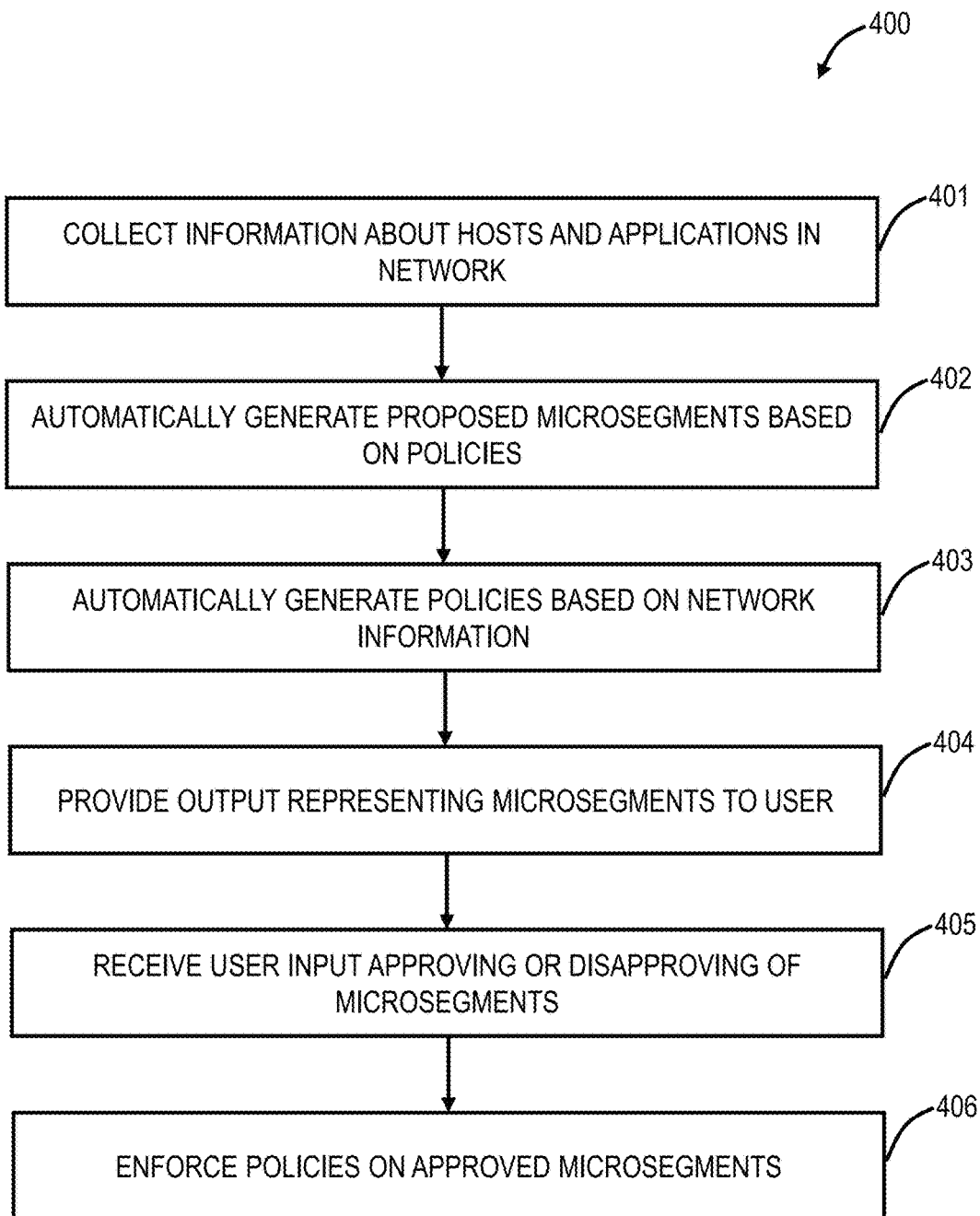
FIG. 9 is a flowchart of an auto segmentation process for automatically proposing network microsegments and for, optionally, receiving human approval of those proposed microsegments.

FIG. 9 is a flowchart of an auto segmentation process 400 for automatically proposing network microsegments and for, optionally, receiving human approval of those proposed microsegments. The system 50 includes a network that may, for example, be implemented in any of the ways disclosed in the Policy Enforcement Patent and/or the Policy Generation Patent. For example, the network may contain one or more hosts, also referred to herein as "systems 102." A system 102 may, for example, be a computer of any kind and may, therefore, include at least one processor and at least one memory. The network may also contain components for collecting network information, which are shown collectively in FIG. 3, and which are described in more detail in the Policy Enforcement Patent. The network information collection module 104 may collect network information from the network, such as by using any of the techniques disclosed in the Policy Enforcement Patent (step 401). This is an example of what is referred to above as surveying the network to find its functional components and their interrelations.

The system 100 also includes a microsegment generation module, which receives the network information as input, and which automatically generates a set of proposed microsegments as output (step 402). Examples of techniques that may be used by the microsegment generation module to generate the proposed microsegments are disclosed in the Policy Generation Patent. The proposed microsegments may have any of the characteristics of microsegments disclosed herein.

The system 100 also includes a policy generation module, which receives the network information as input, and which automatically generates a set of policies 132 as output based on the flow matches in the network information (step 403). The polices 132 are examples of policies that control access to the proposed microsegments. For example, a first subset of the policies 132 may control access to a first one of the proposed microsegments, while a second, different, subset of the policies 132 may control access to a second one of the proposed microsegments. Flows, flow matches, and examples of techniques that may be used by the policy generation module to generate the policies 132 are disclosed in the Policy Generation Patent.

The system 100 also includes a microsegment approval module, which receives the proposed microsegments and associated policies 132 as input, and which generates, based on the proposed microsegments and policies 132, output to a human user representing some or all of the proposed microsegments and/or policies 132, such as by listing one or more of: (1) names and/or IP addresses of the hosts in each of the proposed microsegments; and (2) descriptions of the policies 132, such as flow matches (e.g., source and destination hosts and applications) in the policies 132 (step 404).

The system 100 also includes a user input module, which receives input from the user indicating whether the user approves of each of the proposed microsegments (step 405). Such input may, for example, be binary for each of the microsegments, such as an input indicating "approve" or "disapprove." The input may consist of a single gesture, such as a single click or tap (e.g., on an "approve" or "OK" button). The user may provide separate input for each of one or more of the proposed microsegments, or may provide a single input that applies to some or all of the proposed microsegments. For example, the user may provide a single "approve" input that applies to all of the proposed microsegments. Of note, the human input may be optional and the proposed microsegments can be automatically implemented.

The system 100 also includes a policy enforcement module, which enforces the policies (from among the policies 132) that define and protect the microsegment(s) that have been approved by the user, in response to receiving the user's approval of those microsegment(s) (step 406). The policy enforcement module receives output, which indicates which microsegment(s), if any, the user has approved. If the user input indicates that the user has not approved of any of the microsegment(s), then the policy enforcement module does not enforce any of the policies that control access to any of the proposed microsegments.

§ 8.2 Auto Re-Segmentation to Assign New Applications

Figure 10:
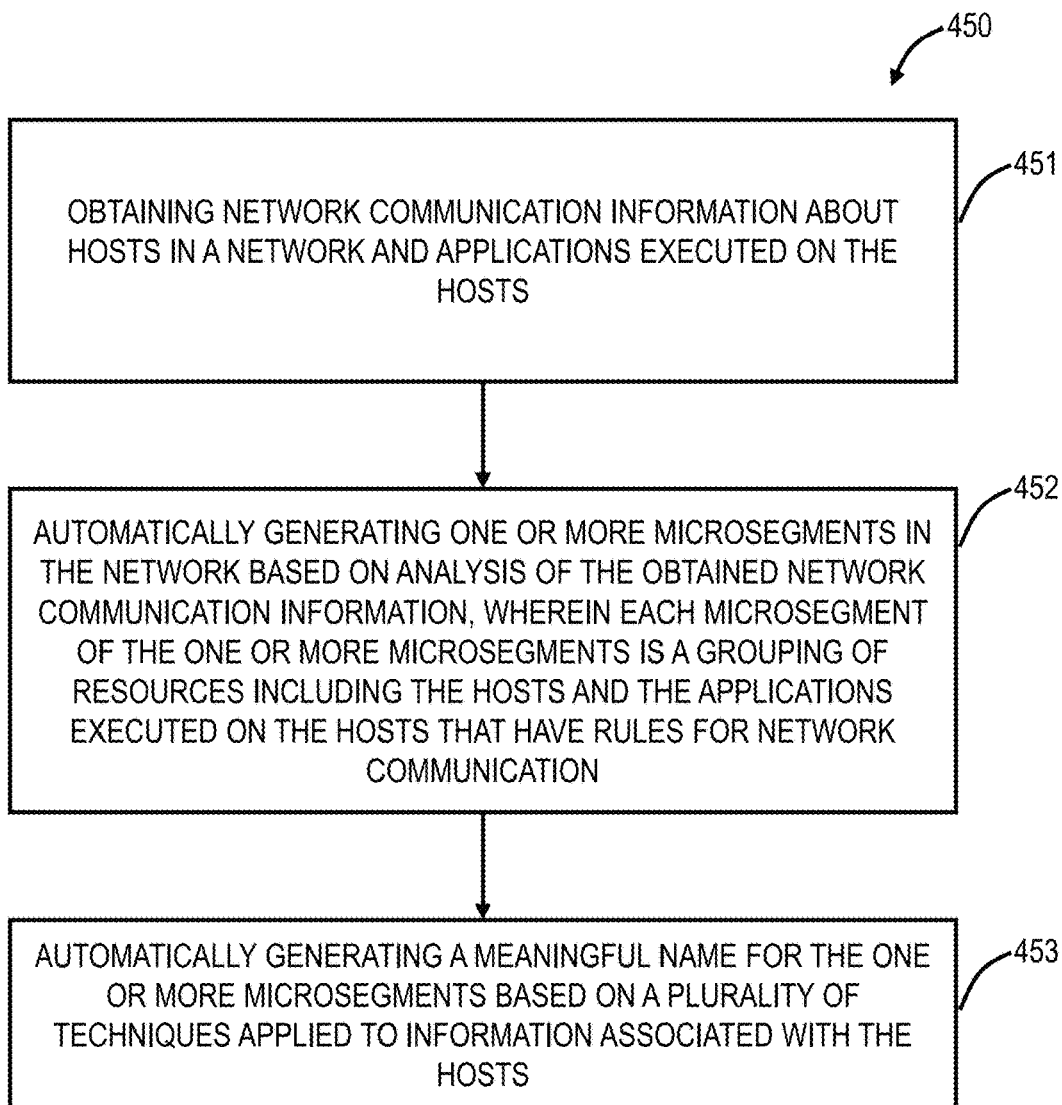
FIG. 10 is a flowchart of a process for auto re-segmentation to assign new applications.

FIG. 10 is a flowchart of a process 450 for auto re-segmentation to assign new applications. The process 450 contemplates implementation as a method including steps, via a server 200 configured to implement the steps, and where the steps are instructions stored in a non-transitory computer-readable medium.

The process 450 includes, subsequent to performing auto segmentation on a network that includes a set of policies of allowable and block communications, observing communication between a plurality of hosts on the network (step 451); determining unassigned communication paths based on the observing that are either blocked because of a lack of a policy of the set of policies or because there is no policy of the set of policies for coverage thereof (step 452); and assigning the unassigned communication paths to corresponding policies of the set of policies (step 453).

The assigning can be based on heuristics. The assigning can be performed without reperforming auto segmentation. The assigning can further include providing the unassigned communication paths to a user; and receiving input from the user for the assigning. Each of the communication paths is a flow in the network where the flow is communication between a first application and a second application.

The auto segmentation can include obtaining network communication information about the plurality of hosts in the network and applications executed on the plurality of hosts; and automatically generating one or more microsegments in the network based on analysis of the obtained network communication information, wherein each microsegment of the one or more microsegments is a grouping of resources including the hosts and the applications executed on the hosts that have rules for network communication.

Each of the communication paths is a flow in the network where the flow is communication between a first application and a second application, wherein the communication between the first application and the second application was not included in the network communication information.

§ 9.0 ZERO-TRUST IDENTITY-BASED PROTECTION OF DATAGRAM-BASED PROTOCOLS

In an embodiment, the system 50 can operate with applications using datagram protocol packets. The present disclosure includes identifying applications are communicating with each other over a datagram protocol, determining which applications are capable of responding to unsolicited datagram protocol messages, and determines telemetry to gather.

For zero-trust access with datagram protocols, the present disclosure includes:

1) A network security agent that enforces application identity-based policy, e.g., the agent 106,
2) A mechanism to enforce sending and receiving of datagram protocol packets on each of the systems 102,
3) Mechanism(s) that collect metadata about the packet's headers, the application(s) associated with the socket, and optionally an inexpensive checksum of the payload, as packets transit a kernel's network stack, such as via the agent 106 on the systems 102,
4) A facility to correlate and merge related telemetry into a single event describing one (or more) UDP packets that flowed along a virtual circuit defined by the source IP address, destination IP address, IP protocol number, and whatever information the upper layer protocol requires to uniquely identify a flow (e.g., in the case of UDP, the source and destination port numbers),
5) A data processing and analytics platform that receives telemetry from a group of network security agents 106, such as in the cloud-based system 100,
6) A facility to send the telemetry events from (4) to (5),
7) A mechanism within (5) that uses metadata in the telemetry events from (4) to uniquely identify virtual circuits in the network between two application programs communicating with each other over a datagram protocol, thereby constructing a graph of all application software communicating via datagram protocols over a network,
8) A mechanism within (1) that tracks kernel datagram protocol sockets as they open and close, sending notifications of these events to (5),
9) A mechanism within (5) that attempts to learn the low-level patterns of every application to determine which application programs are capable of responding to unsolicited datagram messages, which can be called "responders,"
10) A mechanism within (5) that uses the graph constructed by (7), and the knowledge of which applications are "responders" from (9), to build enforcement policies for each application that communicates with other software over a datagram protocol, and
11) A mechanism within (1) for dynamically limiting the amount of metadata collected and transmitted to (5) for each datagram protocol virtual circuit, based upon an estimated probability that the analytics system has already been successful in identifying matching telemetry from the security agent node at the other end of the datagram virtual circuit.

Figure 11:
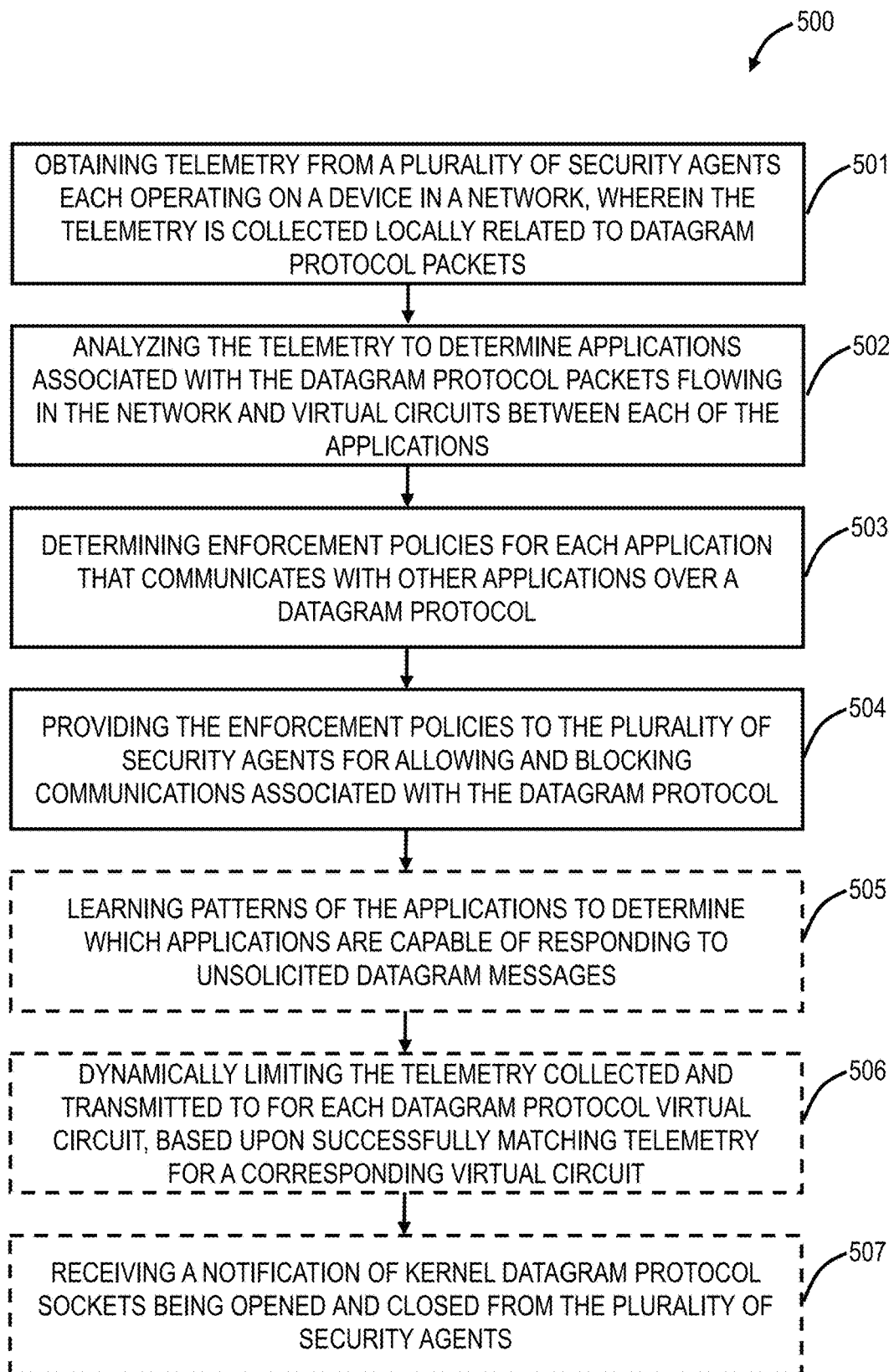
FIG. 11 is a flowchart of a process for application identity-based enforcement of datagram protocols.

FIG. 11 is a flowchart of a process 500 for application identity-based enforcement of datagram protocols. The process 500 contemplates implementation as a method including steps, via a server 200 configured to implement the steps, and where the steps are instructions stored in a non-transitory computer-readable medium.

The process 500 includes obtaining telemetry from a plurality of security agents each operating on a device in a network, wherein the telemetry is collected locally related to datagram protocol packets (step 501); analyzing the telemetry to determine applications associated with the datagram protocol packets flowing in the network and virtual circuits between each of the applications (step 502); determining enforcement policies for each application that communicates with other applications over a datagram protocol (step 503); and providing the enforcement policies to the plurality of security agents for allowing and blocking communications associated with the datagram protocol (step 504).

The telemetry can include metadata about the packet's headers, the application associated with socket, as packets transit a kernel's network stack. The analyzing can include correlating and merging related telemetry into a single event describing one or more datagram protocol packets that flowed along a virtual circuit defined by a source Internet Protocol (IP) address, destination IP address, IP protocol number, and information required to uniquely identify a flow. The analyzing can include constructing a graph of all application software communicating via datagram protocols over the network.

The process 500 can include learning patterns of the applications to determine which applications are capable of responding to unsolicited datagram messages (step 505). The process 500 can include dynamically limiting the telemetry collected and transmitted to for each datagram protocol virtual circuit, based upon successfully matching telemetry for a corresponding virtual circuit (step 506). The process 500 can include receiving a notification of kernel datagram protocol sockets being opened and closed from the plurality of security agents (step 507).

§ 10.0 SYNTHETIC AUDIT EVENTS

Again, the agents 106 are implemented on the systems 102, i.e., hosts, to collect information as well as enforce security policies 134, based on the network communication model 104. In the collection phase, the agents 106 are configured to communicate to the cloud-based system 100, such as for providing matching data, telemetry, network topology, etc. After the policies 134 have been put in place, they prevent flows from happening. Also, there may be events that were not recorded because of factors that made it impossible to do so. That is, in operation, the agents 106 are lightweight and may not log data or communicate to the cloud 100. Therefore, if we want to create an alert, it is not possible to create an alert for an event that did not happen.

Accordingly, the present disclosure includes an approach to create synthetic audit events, i.e., reconstructing source and destination for packets not successfully exchanged. The approach creates an event that would have happened if policies had not blocked it or if conditions had not prevented it. In this manner, this created event is referred to as a synthetic event.

Figure 12:
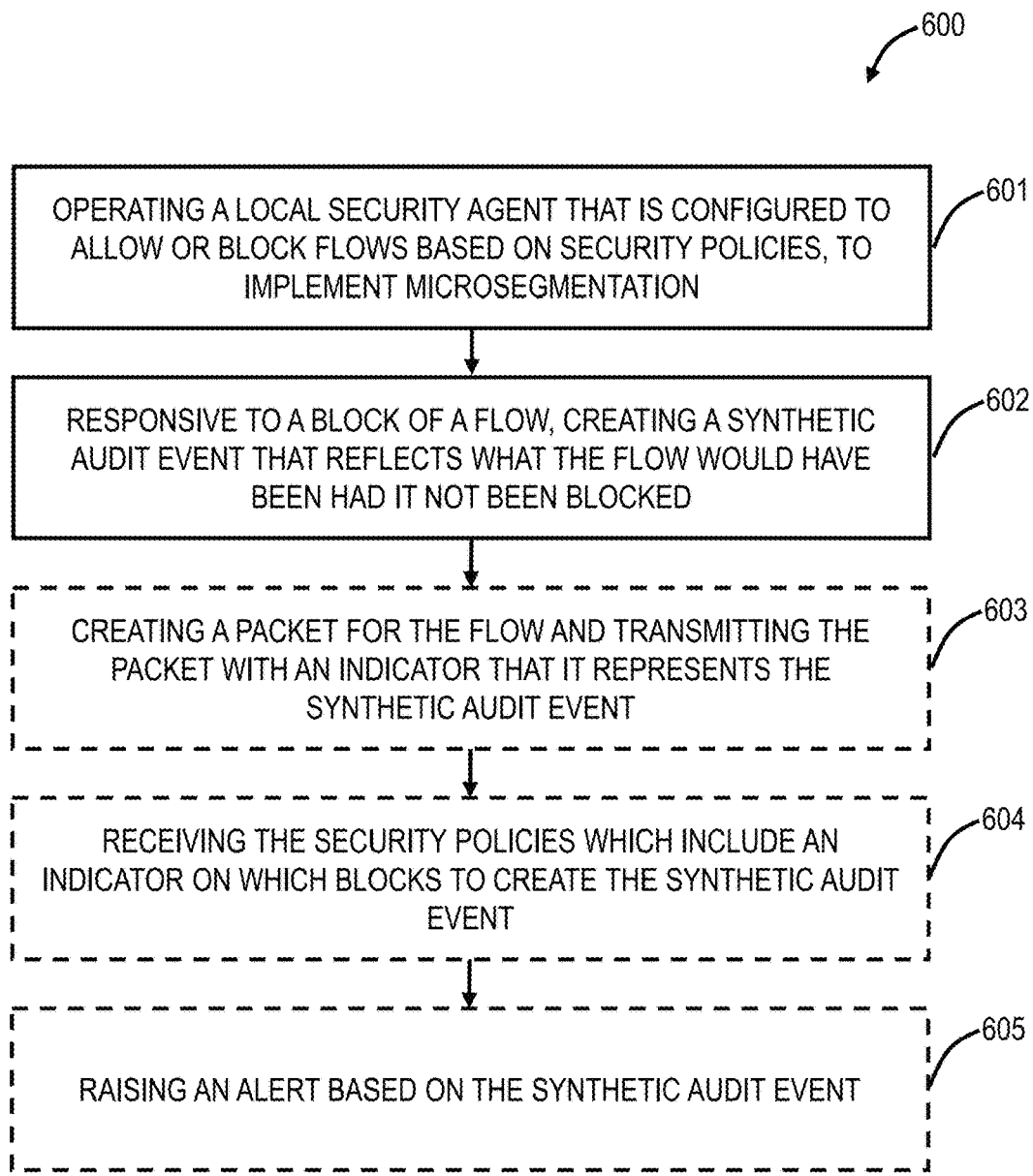
FIG. 12 is a flowchart of a process for creating synthetic audit events.

FIG. 12 is a flowchart of a process 600 for creating synthetic audit events. The process 600 contemplates implementation as a method including steps, via a server 200 configured to implement the steps, and where the steps are instructions stored in a non-transitory computer-readable medium.

Of note, the process 600 includes reconstructing the source and destination for packets not successfully exchanged, and then sending them out to create synthetic audit events. The process 600 includes combining IP socket and connection data from multiple sources to determine the most likely source and destination from IP connections which have not successfully exchanged packets. The resulting combination is a single "synthetic" event that a network and/or application operator may use to debug network connectivity when software is not able to complete connections, e.g., determine that a database client attempted to connect to a database server, that the network policies in place would have allowed the connection, but the connection was not established due to other network conditions.

The determination can be based on multiple time-series sources, such as, for example:
Packet metadata from one or both sides of the connection
ISN (initial sequence number)
Source address
Destination address
Source port
Destination port
Discovered network topology between source and destination systems such as SNAT/DNAT address or port mapping
Applications running on source or destination that are using the relevant ports at the time the packet(s) were sent The process 600 includes operating a local security agent that is configured to allow or block flows based on security policies, to implement microsegmentation (step 601); and, responsive to a block of a flow, creating a synthetic audit event that reflects what the flow would have been had it not been blocked (step 602).

The process 600 can include creating a packet for the flow and transmitting the packet with an indicator that it represents the synthetic audit event (step 603). The process 600 can include receiving the security policies which include an indicator on which blocks to create the synthetic audit event (step 604).

The synthetic audit event can include reconstruction of a source and a destination for the flow. The reconstruction can be based on a plurality of packet metadata, initial sequence number, source address, destination address, source port, destination port, network topology, and applications. The process 600 can include raising an alert based on the synthetic audit event (step 605). The host can include a database.

§ 11.0 STREAM PROCESSING OF TELEMETRY

Again, the agents 106 installed on hosts (systems 102) in a network report on what can be seen from where it is—that is, the network topology. Note, that this is independent of whether there are actually networks flows to those locations. From this, a complete picture of IP addresses and listening sockets is created, such as for use in microsegmentation. However, it is preferable to do this incrementally as the information arrives, rather than to do it occasionally as a batch, both for efficiency's sake as well as being up-to-date as quickly as possible. That is, the current approach for auto microsegmentation is collect, build, use, namely collect the network topology, build the security policies to enforce microsegments, and use the security policies.

The present disclosure provides an incremental approach—collect and build incrementally, and use. Advantageously, this approach is more efficient and captures changes quicker. The cloud-based system 100 can be configured for stream processing of discrete network topology messages from remote systems 102 to generate a complete, current view of a remote system's IP addresses and listening sockets. This process then merges these data which results in fully resolved "wildcard" IP addresses, which are bound dynamically to any address within a particular network namespace. Any change to either a remote system's listening sockets or IP addresses is automatically reflected in the resulting output data stream, allowing downstream components to respond immediately to changes.

Figure 13:
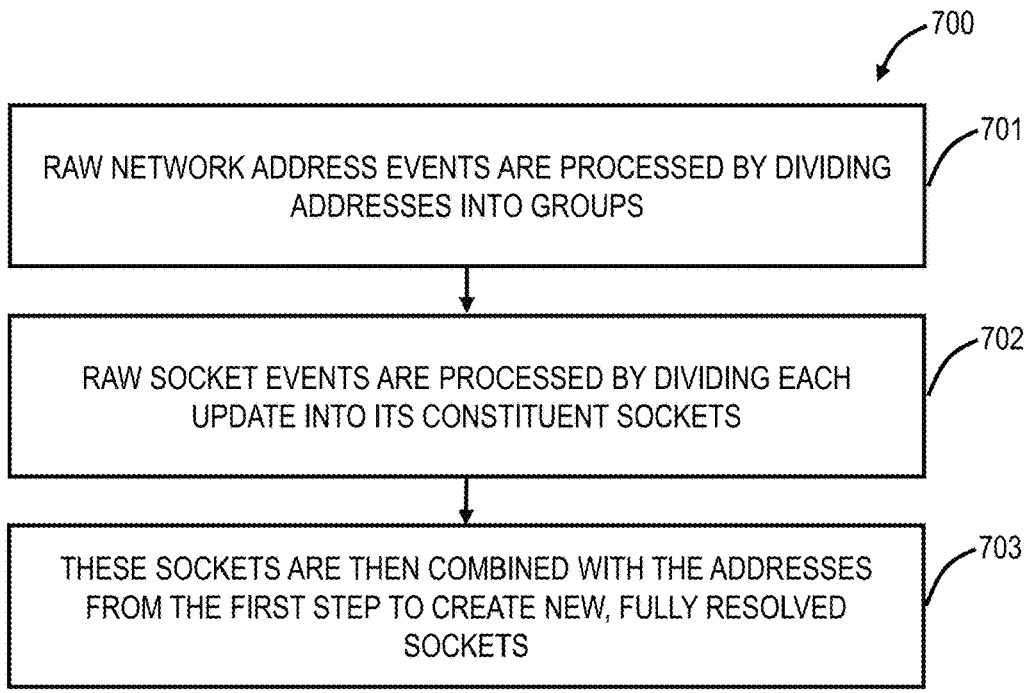
FIG. 13 is a flowchart of a process implemented by the agents to stream process the network topology.

FIG. 13 is a flowchart of a process 700 implemented by the agents 106 to stream process the network topology. For each agent 106, the process 700 is as follows:

Raw network address events are processed by dividing addresses into groups (step 701), each addressable by the following data:
remote system's ID
the IP address family (i.e., IPv4 or IPv6)
network namespace Raw socket events are processed by dividing each update into its constituent sockets (step 702). At this stage, the sockets are a mix of single-IP and wildcard sockets.

These sockets are then combined with the addresses from the first step to create new, fully resolved sockets (step 703). Wildcard sockets create one resolved socket for each network address in the matching group. Single-IP sockets create one resolved socket if and only if there is a network address with a matching IP address. Changes to either network addresses or sockets will trigger a new comparison, so the order the messages were received does not matter.

Figure 14:
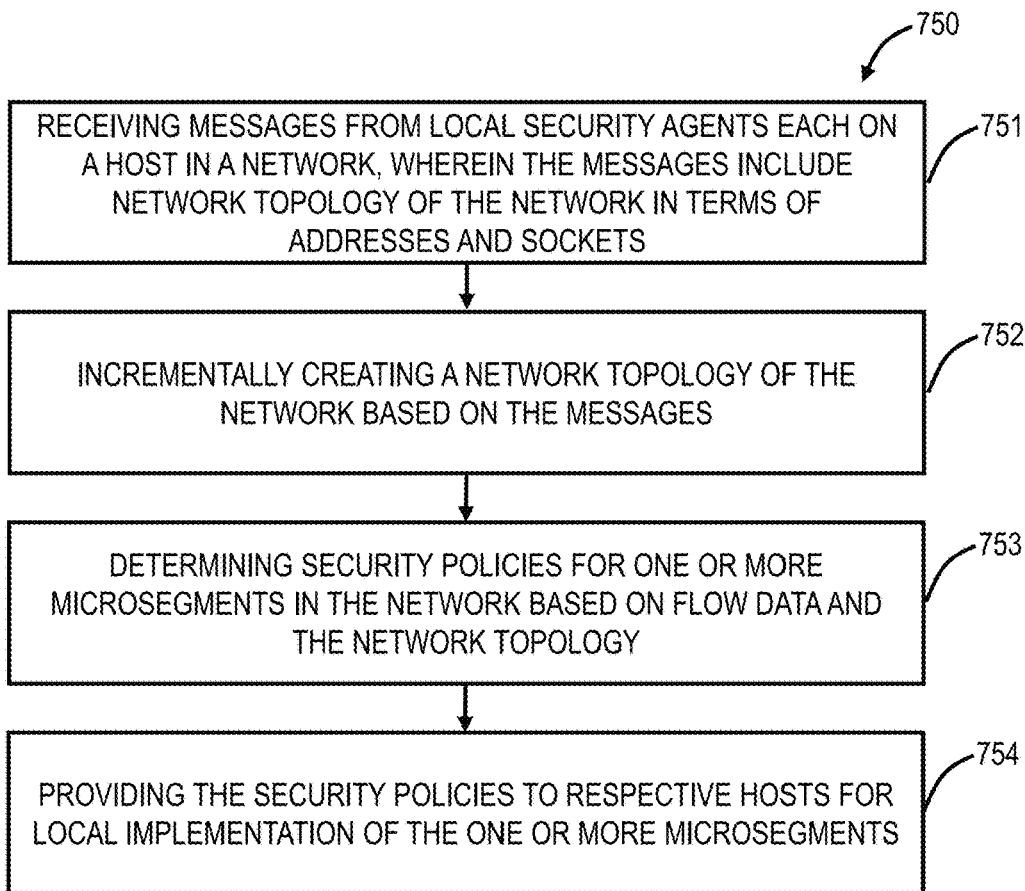
FIG. 14 is a flowchart of a process for stream processing of network telemetry for microsegmentation.

FIG. 14 is a flowchart of a process 750 for stream processing of network telemetry for microsegmentation. The process 750 includes receiving messages from local security agents each on a host in a network, wherein the messages include network topology of the network in terms of addresses and sockets (step 751); incrementally creating a network topology of the network based on the messages (step 752); determining security policies for one or more microsegments in the network based on flow data and the network topology (step 753); and providing the security policies to respective hosts for local implementation of the one or more microsegments (step 754).

The process 750 can include receiving updated messages which change the network topology; and redetermining the security policies for the one or more microsegments.

The process 750 can include, in the agent 106, processing raw network address events; processing raw socket events; and combining the raw network address events and the raw socket events. The raw network address events can be processed by dividing addresses into groups based on any of remote system identifier, address family, and namespace. The combining can include any of wildcard sockets create one resolved socket for each network address in a matching group, single IP sockets create one resolved socket if and only if there is a network address with a matching IP address, and changes to either network addresses or sockets triggers a new comparison.

§ 12.0 SOFTWARE SECURITY AGENT UPDATES VIA MICROCODE

The security agents 106 are in the difficult position of needing to adapt to changing environments and business requirements while being subject to change control windows imposed by customers. In a practical embodiment, the systems 102 can be databases, servers, etc. in a data center, and the network operator may have stringent requirements for upgrades. This puts a security vendor in the position of having to come up with an alternative mechanism of changing security agent 106 behavior without modifying the distributed agent software executable in any manner (i.e., the executable files distributed via some packaging mechanism to the customer cannot be modified until the customer change freeze is lifted).

This disclosure introduces a mechanism for security software that behaves similarly to how microprocessor vendors ship what is often called "microcode"—low-level code that can be used to implement small changes to otherwise immutable silicon chips (microcode permits chip vendors to distribute small fixes to bugs that are permanently etched into the chip by means of bypassing certain parts of circuit, and replacing them with sequences of microprocessor instructions that return the desired result without utilizing the now-disabled circuitry). This mechanism allows microprocessor vendors to mitigate the effects of certain classes of design defects in the field. Similarly, this disclosure allows the security software vendor to mitigate the effects of changes within software environments, the threat environment, or to ameliorate the effects of certain bugs, via shipment of digitally signed scripts that alter the behavior of the compiled code subject to the change freeze.

Figure 15:
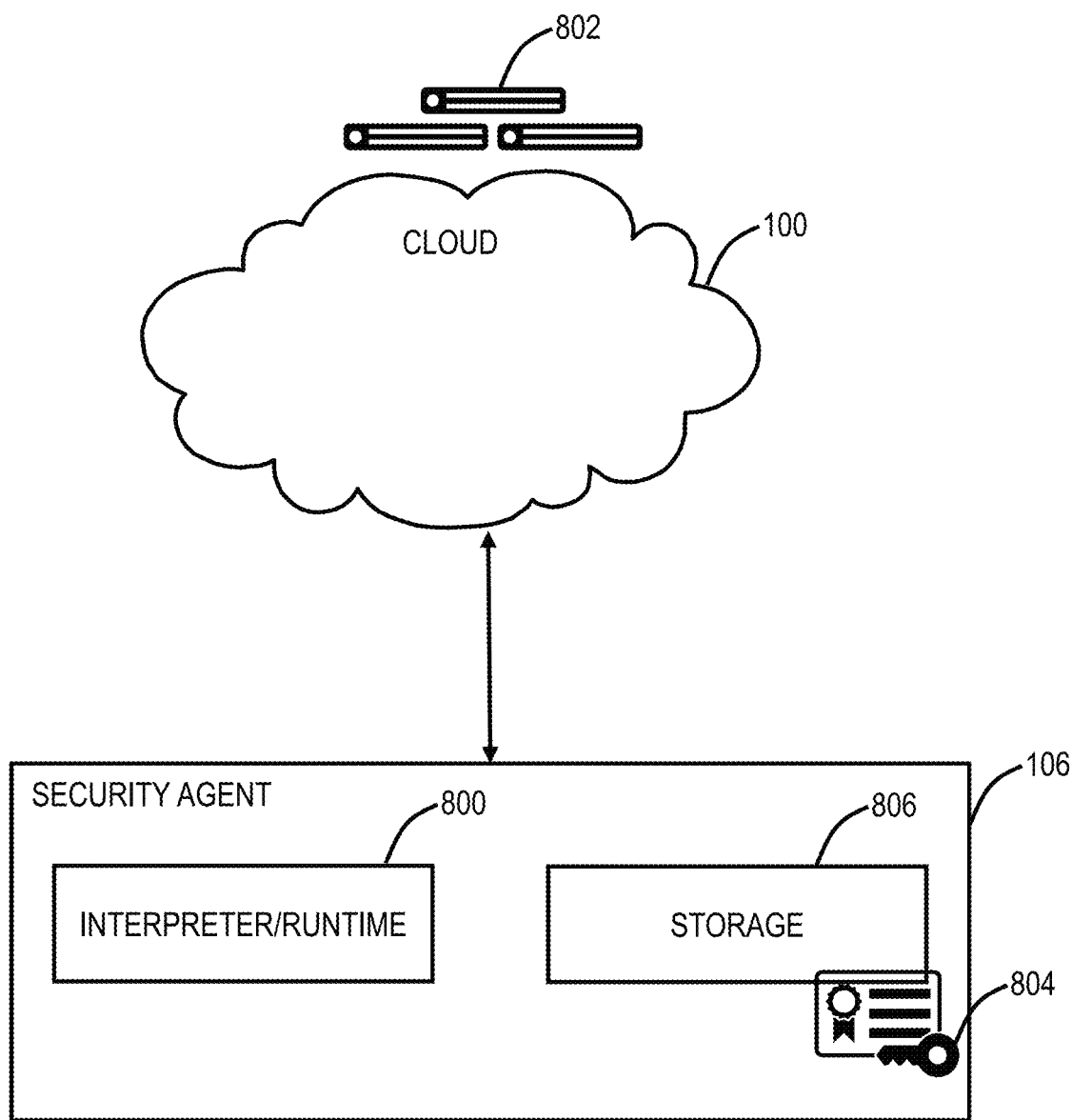
FIG. 15 is a block diagram of a security agent having an interpreter embedded therein for executing code.

FIG. 15 is a block diagram of a security agent 106 having an interpreter 800 embedded therein for executing code. FIG. 15 provides a logical view of the functionality of the security agent 106. Again, the security agent 106 is executed on a system 102 (i.e., a host). The security agent 106 includes the interpreter 800 for running script programming language(s) embedded within the security agent 106. For example, the script programming language can include Lua.

The security agent 106 can be communicatively coupled to a command & control server 800, such as one of the nodes 150, 152 in the cloud-based system 100. The security agents 106 trusts and communicates with, to send digitally signed scripts 804 to the agent 106 along with instruction of which "hook"(s) each script 804 should be bound to.

The security agent 106 includes a durable storage repository 806 for storing/retrieving the digitally signed scripts, and their assigned "hook" points. The security agent 106 includes a mechanism for embedding public code signing key(s), a mechanism for verifying the digital signature of scripts 804 from the command & control server 802, and a mechanism for alerting when the digital signature of a script 804 fails to verify.

The security agent 106 includes hooks. A hook is a place and usually an interface provided in packaged code that allows a programmer to insert customized programming. The "hook" points are hard-coded into the agent's executable code, where script code may be called to inquire whether certain security agent compiled code components should be disabled to one or more ends:

1. enable an improved implementation in a script
2. to work around a bug
3. perform differential analysis while troubleshooting
4. to mitigate the effects of a customer incident The presence of "hook" points hard-coded into the agent's executable code, where script code may be called to modify the behavior of the agent 106, data objects stored within the agent's memory, data objects stored within the security agent's durable storage, or messages or call arguments sent or received from other processes or servers—all within predefined bounds enforced by the compiled code Infrastructure enabling the script code to read, modify, and interact with: data objects in memory defined by compiled code, data objects on durable storage defined by compiled code, and messages or call arguments defined by compiled code that are sent or received from other processes, the kernel, or other servers.

Memory protection techniques, such as storing script code in read-only memory, periodically verifying the script code has not been modified, disabling debugger access to the security agent via a kernel module, and periodically checking page table state to ensure the script pages are read-only except when they are being updated with new code that passed digital signature verification.

§ 13.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable storage medium having computer-readable code stored thereon for programming a host that includes one or more processors to perform steps of:

operating a local security agent that is configured to allow or block flows based on security policies, to implement microsegmentation where policies for allowing or blocking flows are determined and put in place by a cloud service and enforcement of the policies is performed locally in a plurality of hosts including the host, via the local security agent on the host and corresponding local security agents on the plurality of hosts;

responsive to a block of a flow, reconstructing a source and destination of the flow and creating a synthetic audit event based on the reconstructed source and destination that reflects what the flow would have been had it not been blocked, wherein the reconstructing the source and destination comprises using local host-state information without accessing a remote security policy store or a remote network security device, wherein the reconstructing the source and destination of the flow further comprises combining packet metadata, initial sequence numbers, source and destination addresses and ports, network topology information including address or ort mappings resulting from network address translation, and identity information of applications running on the source and destination hosts associated with the flow, and wherein the synthetic audit is configured for network debugging in an absence of network connectivity; and providing the synthetic audit event to the cloud service for analyzing the policies related to the microsegmentation including analyzing the block of the flow.

2. The non-transitory computer-readable storage medium of claim 1, wherein the steps further include
   creating a packet for the flow and transmitting the packet with an indicator that it represents the synthetic audit event.

3. The non-transitory computer-readable storage medium of claim 1, wherein the steps further include
   receiving the security policies which include an indicator on which blocks to create the synthetic audit event.

4. The non-transitory computer-readable storage medium of claim 1, wherein reconstructing the source and a destination for the flow includes combining Internet Protocol (IP) socket and connection data from one or more sources to determine a most likely source and destination for the flow which have not successfully exchanged packets, the reconstructing is sent out to create the synthetic audit event.

5. The non-transitory computer-readable storage medium of claim 4, wherein the reconstruction is based on a plurality of time-series sources including packet metadata, initial sequence number, source address, destination address, source port, destination port, network topology, and applications.

6. The non-transitory computer-readable storage medium of claim 1, wherein the steps further include
   raising an alert based on the synthetic audit event.

7. The non-transitory computer-readable storage medium of claim 1, wherein the host includes a database.

8. A method comprising steps of:
   operating a local security agent that is configured to allow or block flows based on security policies, to implement microsegmentation where policies for allowing or blocking flows are determined and put in place by a cloud service and enforcement of the policies is performed locally in a plurality of hosts including the host, via the local security agent on the host and corresponding local security agents on the plurality of hosts, responsive to a block of a flow, reconstructing a source and destination of the flow and creating a synthetic audit event based on the reconstructed source and destination that reflects what the flow would have been had it not been blocked, wherein the reconstructing the source and destination comprises using local host-state information without accessing a remote security policy store or a remote network security device, wherein the reconstructing the source and destination of the flow further comprises combining packet metadata, initial sequence numbers, source and destination addresses and ports, network topology information including address or port mappings resulting from network address translation, and identity information of applications running on the source and destination hosts associated with the flow, and wherein the synthetic audit is configured for network debugging in an absence of network connectivity, and providing the synthetic audit event to the cloud service for analyzing the policies related to the microsegmentation including analyzing the block of the flow.

9. The method of claim 8, wherein the steps further include creating a packet for the flow and transmitting the packet with an indicator that it represents the synthetic audit event.

10. The method of claim 8, wherein the steps further include receiving the security policies which include an indicator on which blocks to create the synthetic audit event.

11. The method of claim 8, wherein reconstructing the source and a destination for the flow includes combining Internet Protocol (IP) socket and connection data from one or more sources to determine a most likely source and destination for the flow which have not successfully exchanged packets.

12. The method of claim 11, wherein the reconstruction is based on a plurality of packet metadata, initial sequence number, source address, destination address, source port, destination port, network topology, and applications.

13. The method of claim 8, wherein the steps further include raising an alert based on the synthetic audit event.

14. The method of claim 8, wherein the host includes a database.

15. An apparatus comprising:
one or more processors and memory storing instructions that, when executed, cause the one or more processors to operate a local security agent that is configured to allow or block flows based on security policies, to implement microsegmentation where policies for allowing or blocking flows are determined and put in place by a cloud service and enforcement of the policies is performed locally in a plurality of hosts including the host, via the local security agent on the host and corresponding local security agents on the plurality of hosts;

responsive to a block of a flow, reconstructing a source and destination of the flow and creating a synthetic audit event based on the reconstructed source and destination that reflects what the flow would have been had it not been blocked, wherein the reconstructing the source and destination comprises using local host-state information without accessing a remote security policy store or a remote network security device, wherein the reconstructing the source and destination of the flow further comprises combining packet metadata, initial sequence numbers, source and destination addresses and ports, network topology information including address or port mappings resulting from network address translation, and identity information of applications running on the source and destination hosts associated with the flow, and wherein the synthetic audit is configured for network debugging in an absence of network connectivity; and provide the synthetic audit event to the cloud service for analyzing the policies related to the microsegmentation including analyzing the block of the flow.

16. The apparatus of claim 15, wherein the instructions that, when executed, further cause the one or more processors to create a packet for the flow and transmitting the packet with an indicator that it represents the synthetic audit event.

17. The apparatus of claim 15, wherein the instructions that, when executed, further cause the one or more processors to receiving the security policies which include an indicator on which blocks to create the synthetic audit event.

18. The apparatus of claim 15, wherein deconstructing the source and a destination for the flow includes combining Internet Protocol (IP) socket and connection data from one or more sources to determine a most likely source and destination for the flow which have not successfully exchanged packets.

19. The apparatus of claim 18, wherein the reconstruction is based on a plurality of packet metadata, initial sequence number, source address, destination address, source port, destination port, network topology, and applications.

20. The apparatus of claim 15, wherein the instructions that, when executed, further cause the one or more processors to raising an alert based on the synthetic audit event.

* * * * *